(12) United States Patent
Baxter et al.

(10) Patent No.: US 11,496,792 B2
(45) Date of Patent: Nov. 8, 2022

(54) INTERACTIVE VIDEO OVERLAY WITH PERSISTENT CART

(71) Applicant: Global Sports & Entertainment Marketing, LLC, St. George, UT (US)

(72) Inventors: Garrett Baxter, St. George, UT (US); Taha Salah-Ud-Din Abbasi, Smyrna, DE (US)

(73) Assignee: Global Sports & Entertainment Marketing, LLC, St. George, UT (US)

( * ) Notice: Subject to any disclaimer, the term of this patent is extended or adjusted under 35 U.S.C. 154(b) by 0 days.

(21) Appl. No.: 17/740,189

(22) Filed: May 9, 2022

(65) Prior Publication Data
US 2022/0272408 A1 Aug. 25, 2022

Related U.S. Application Data

(63) Continuation of application No. 17/336,153, filed on Jun. 1, 2021, now Pat. No. 11,330,323, which is a
(Continued)

(51) Int. Cl.
*H04N 21/431* (2011.01)
*H04N 21/43* (2011.01)
(Continued)

(52) U.S. Cl.
CPC ... *H04N 21/4316* (2013.01); *H04N 21/43074* (2020.08); *H04N 21/4782* (2013.01); *H04N 21/47815* (2013.01)

(58) Field of Classification Search
CPC ......... H04N 21/4316; H04N 21/43074; H04N 21/47815; H04N 21/4782
See application file for complete search history.

(56) References Cited

U.S. PATENT DOCUMENTS 5,504,519 A 4/1996 Remillard
6,295,647 B1 9/2001 Ramaswamy
(Continued)

FOREIGN PATENT DOCUMENTS

CN 111279336 A * 6/2020 ........... G06F 16/951
WO WO 20140039592 3/2014
(Continued)

OTHER PUBLICATIONS

Emilee Helm, "The Cost of Content: The Ins and Outs of Earning Money on Twitch", Jul. 12, 2019, https://bloag.gamesight.io, pp. 1-10 (Year: 2019).
(Continued)

*Primary Examiner* — Nicholas T Corbo
(74) *Attorney, Agent, or Firm* — Knobbe, Martens, Olson & Bear, LLP

(57) ABSTRACT

Systems and methods are provided for enabling in-video shopping functionality that includes a cross-video shopping cart. For example, a user may add items to an electronic shopping cart that is persistent across two different websites or pages, where items may be added to the shopping cart within overlays on two separate videos presented on the respective pages. The persistent shopping cart features may also enable a persistent shopping cart that enables joint checkout involving two or more different payment processors, two or more different third-party shopping systems, two or more different publisher systems, two or more different video hosting platforms, or two or more different client devices sharing a user account.

19 Claims, 22 Drawing Sheets

Related U.S. Application Data continuation of application No. 16/994,468, filed on Aug. 14, 2020, now Pat. No. 11,051,067.

(51) Int. Cl.
  *H04N 21/4782* (2011.01)
  *H04N 21/478* (2011.01)

(56) References Cited

U.S. PATENT DOCUMENTS

| | | | |
|---|---|---|---|
| 9,344,754 | B2 | 5/2016 | Briggs et al. |
| 9,697,563 | B2 | 7/2017 | Fitzpatrick |
| 9,875,489 | B2 | 1/2018 | Spitz et al. |
| 10,440,436 | B1 | 10/2019 | Taylor et al. |
| 10,805,666 | B2 | 10/2020 | Baxter |
| 11,051,067 | B1 | 6/2021 | Baxter et al. |
| 11,330,323 | B2 | 5/2022 | Baxter et al. |
| 2006/0178187 | A1 | 8/2006 | Walker et al. |
| 2007/0150360 | A1 | 6/2007 | Getz |
| 2007/0243928 | A1 | 10/2007 | Iddings |
| 2010/0050082 | A1 | 2/2010 | Katz et al. |
| 2011/0162002 | A1 | 6/2011 | Jones et al. |
| 2012/0239529 | A1 | 9/2012 | Low et al. |
| 2012/0291056 | A1 | 11/2012 | Donoghue |
| 2013/0151352 | A1 | 6/2013 | Tsai et al. |
| 2014/0019298 | A1* | 1/2014 | Suchet ............... G06Q 30/0633 705/26.8 |
| 2014/0095330 | A1 | 4/2014 | Briggs et al. |
| 2014/0270337 | A1 | 9/2014 | Zhao et al. |
| 2014/0359656 | A1 | 12/2014 | Bianca et al. |
| 2015/0026728 | A1 | 1/2015 | Carter et al. |
| 2015/0039468 | A1 | 2/2015 | Spitz et al. |
| 2015/0074710 | A1 | 3/2015 | Spitz et al. |
| 2015/0249872 | A1 | 9/2015 | Lee et al. |
| 2016/0019628 | A1* | 1/2016 | Udumudi ............ G06Q 30/0633 705/26.1 |
| 2016/0029070 | A1 | 1/2016 | Briggs et al. |
| 2016/0210674 | A1* | 7/2016 | Allen ............... G06Q 30/0635 |
| 2016/0239198 | A1* | 8/2016 | Shenkler ............ H04N 21/4316 |
| 2016/0241929 | A1* | 8/2016 | Shenkler ............ H04N 21/6125 |
| 2017/0013309 | A1 | 1/2017 | Jallouli |
| 2017/0301003 | A1 | 10/2017 | Spitz et al. |
| 2018/0025405 | A1 | 1/2018 | Jones et al. |
| 2018/0063573 | A1 | 3/2018 | Avedissian et al. |
| 2018/0310066 | A1 | 10/2018 | Kobayashi et al. |
| 2018/0322481 | A1 | 11/2018 | Baxter |
| 2020/0108316 | A1 | 4/2020 | Nay |
| 2020/0196018 | A1 | 6/2020 | Burbank et al. |
| 2021/0235147 | A1 | 7/2021 | Baxter |
| 2022/0053233 | A1 | 2/2022 | Baxter et al. |

FOREIGN PATENT DOCUMENTS

| | | | | |
|---|---|---|---|---|
| WO | WO-2018094201 | A | * 5/2018 | ............ G06F 16/78 |
| WO | WO 2019216952 | | 11/2019 | |
| WO | WO 2022036037 | | 2/2022 | |

OTHER PUBLICATIONS

Google, "YouTube Player API Reference for iFrame Embed"—as archived on Jul. 20, 2019: https://web.archive.org/web/20190720220910/https://developers.google.com/youtube/iframe_api_reference.

"<iframe>"; Jul. 17, 2015, HTML.com; pp. 1-3 (Year: 2015).

International Seacrh Report and Written Opinion, dated Feb. 5, 2019, PCT/US18/062680 to Baxter.

International Search Report and Written Opinion in PCT Application No. PCT/US2021/045663 dated Nov. 23, 2021.

Mei, Tao, VideoSense-Towards Effective Online Video Advertising, Sep. 23-28, 2007, Microsoft Research Asia, pp. 1075-1084 (Year: 2007).

"New HGTV and Food Network Apps Make Shopping Easy on Fire TV"; Jul. 7, 2016; BusinessWire.com; pp. 1-3 (Year: 2016).

Olenski, Steve; "With MikMak's Latest Move, Brands Can Expedite Path to Purchase on Instagram and Snapchat"; May 15, 2017; Forbes.com; pp. 1-5 (Year: 2017).

Practical ecommerce.com, '13 Platforms for Shoppable Video', Aug. 3, 2020 [retrieved on Nov. 13, 2021].

PRWeb, "Your Home TV Partners with SimuStream, Introducing Technology that Allows Consumers to Buy While Streaming Home Product Videos," Jun. 17, 2020.

Saba, Elias; "Syfy and Bravo apps arrive on the Amazon Fire TV and Fire TV Stick"; Dec. 3, 2016; AFTVnews.com; p. 1 (Year: 2016).

whatis.techarget.com, 'Iframe (Inline Frame)', Jan. 2015 [retrieved on Nov. 13, 2021].

* cited by examiner

INTERACTIVE VIDEO OVERLAY WITH PERSISTENT CART

This application is a continuation of U.S. patent application Ser. No. 17/336,153, entitled "INTERACTICE VIDEO OVERLAY," filed Jun. 1, 2021 which is a continuation of U.S. patent application Ser. No. 16/994,468, entitled "INTERACTIVE VIDEO OVERLAY," filed Aug. 14, 2020, which are each hereby incorporated by reference in their entirety. Any and all applications for which a foreign or domestic priority claim is identified in the Application Data Sheet as filed with the present application are hereby incorporated by reference under 37 CFR 1.57.

BACKGROUND

There are a large number or different network-based services that enable users to view video content. For example, a viewing user may use a web browser or different dedicated software applications to access a large number of different video hosting platforms (such as those offering user-generated video content and/or professionally produced video content available on demand) and live streaming video platforms (such as video content that is filmed and uploaded substantially in real time as viewing users consume it). In addition, thousands of entities and individuals that are not primarily involved in video production or distribution frequently include videos embedded within a webpage or other user interface operated by the entity or individual (such as a video about a product or service offered by a given company or individual).

Consider an example of a user viewing a video (such as via a browser or application installed on a computing device of the user) who is interested in accessing additional information or performing some action with respect to the subject matter of the video (such as purchasing a product or signing up for a service). Selectable options that enable the user to do so typically require the user to navigate away from the video and/or disrupt playback of the video on the user's device. For example, it is common for advertisement content to be presented in a manner in which a user selection of such content (e.g., via a touch or click selection) causes a browser or other application on the user's device to open a new page or user interface. Such an interaction typically either results in stopping playback of a video in the initial page by replacing the video-embedded page with a new page, or obscures view of the window or page in which video playback occurred, such as by opening a pop-up window.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
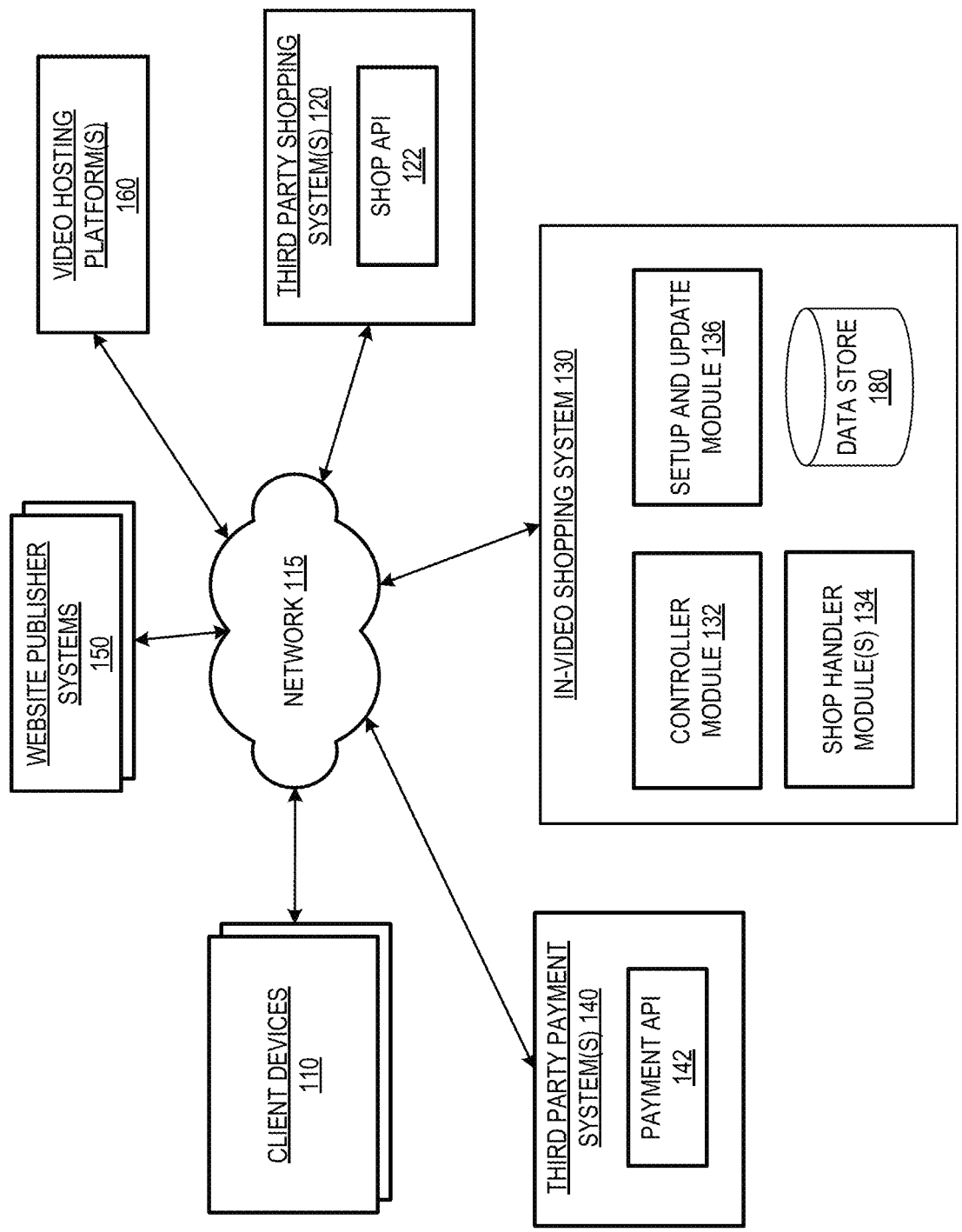
FIG. 1 illustrates an example operating environment or network architecture in which aspects of the present disclosure may be implemented.

Generally described, aspects of the present disclosure relate to specific systems and methods for supplementing a video playback interface with dynamic selectable options that enable a viewing user to perform various calls to action within the video playback portion of the interface. The calls to action may be set by an entity associated with the video, and may include the ability for the user to browse and purchase items without the user needing to leave the video playback interface or even look away from the portion of the interface in which video playback occurs, in some embodiments. For example, an interactive content overlay may be presented that appears in a partially translucent manner to be over a portion of the video while the video is played, and the user may make interactions within the overlay. The user interactions may cause outgoing network requests to be sent from the user's device for updated content that is then displayed in the interactive content overlay while video playback continues and/or for transactions to be completed without redirecting the user's browser or other application to a separate page or user interface.

As will be further discussed herein, a platform described herein for presenting interactive video overlay content may be configured to operate in association with any of a potentially large number of different video hosting platforms, payment processing services, website publishers, video streaming services, and/or third-party shopping platforms. Accordingly, an administrative user on behalf of a website publisher, video producer, video rights holder and/or other entity requesting to set up an interactive in-video shopping experience via an in-video shopping system, as described herein, may select to have the in-video shopping system cooperatively integrate with various third-party platforms to handle different aspects of the video distribution, item data importation, purchase processing, and/or other back-end functionality.

While aspects of the present disclosure often reference examples in which a selectable item within a video overlay enables a viewing user to purchase a product or service, many features described herein have utility outside of a shopping context. For example, selectable options within a video overlay as disclosed herein may additionally or alternatively be implemented in order to enable a user to perform some other action associated with a call-to-action desired by a given entity employing the services provided by the in-video shopping system described herein. Such actions may include, as non-limiting examples, donating time or money to a charitable cause, supporting a petition or political cause or candidate, signing up for a newsletter or mailing list (or other subscription service), downloading or requesting remote access to digital content or software, and/or many other uses. Accordingly, the interactive content options displayed may be associated with experiences unrelated to shopping, such as data collection via an interactive form, an interactive quiz or game (such as an interactive multiple choice trivia or other game presented in synchronization with the underlying video content), etc.

FIG. 1 illustrates an example operating environment or network architecture in which aspects of the present disclosure may be implemented. The illustrative environment includes client devices 110, website publisher systems 150, one or more optional third party payment processing systems 140 (each of which may include a different payment API 142), one or more optional third party shopping systems 120 (each of which may include a different shop API 122), one or more optional video hosting platforms 160, and an in-video shopping system 130. Communications between various illustrated devices and systems in FIG. 1 may be via one or more networks 115, such as the Internet. As will be described further herein, the in-video shopping system 130 may be the primary system that enables various features and functionality described herein to be presented on individual client devices 110 via communications with other illustrated systems as appropriate. In some embodiments, the in-video shopping system 130 may implement functionality of a payment system, shopping platform, and/or video hosting platform, either instead of or as an additional option to a third party payment system 140, third party shopping system 120, and/or video hosting platform 160, respectively (such that systems 140, 120 and 160 may not be present in some embodiments).

In some embodiments, the client devices 110 may be any of a wide variety of computing devices. For example, individual client devices 110 may include a laptop computer, a personal computer, a personal digital assistant (PDA), a mobile phone, a smartphone, a wearable computing device, an electronic book reader, a digital media player, a tablet computer, a gaming console, a kiosk, an augmented reality device, a gaming or gambling-related machine (such as a slot machine), another wireless device, an Internet-enabled television, and/or others. In some embodiments, the client devices 110 may each operate a browser or other software application configured to request content such as webpages or other user interface data from servers associated with, for example, website publishers 150 and/or video hosting platforms 160. Page or user interface data delivered to an individual client device 110 may include code that causes the client device to request additional code from the in-video shopping system 130 that causes the client device to present in-video functionality that will be further described herein.

The in-video shopping system 130 includes or is in communication with one or more electronic data stores 180 (such as persistent storage embodied in a hard drive, disk, server-based storage, etc.) that may store various data that will be described further below in the operation of the in-video shopping system 130. A controller module 132 of the in-video shopping system 130 may be responsible for, among other functionality, handling front-end communications between client devices 110 and the in-video shopping system 130, as well as coordinating operations involving the shop handler module(s) 134 and the setup and update module 136 in association with such client requests. One or more shop handler module(s) 134 may be configured to handle communications between different third party shopping systems 120, such as to access product information to be offered via in-video shopping functionality provided by the system 130 and to complete purchase requests. The shop handler modules may further be configured to periodically or dynamically obtain updated item information from a corresponding shopping system (such as available item quantities, prices, etc., which may be obtained via a push or pull model depending on the API capabilities of a particular shopping system). Different shopping systems 120 with which the in-video shopping system 130 is set up to communicate may be associated with different shop handler modules 134 that are each configured to communicate with a different shop API 122. The setup and update module 136 may enable administrative users that manage a given virtual store and/or own rights in underlying video content to set up an account with the in-video shopping system 130, associate the account with a particular account with shopping system 120, select items to be offered to video viewers, select a payment provider, etc.

The third party payment systems 140 may be systems or services that include an application programming interface (API) that enable other websites, services, or entities to complete purchase transactions or transfer funds to a desired recipient. For example, a given third party payment system may be configured to receive and/or store credit card details, bank account details or other payment method data for each of a potentially large number of individuals or business entities. The third party payment system may be configured to act as a payment processing intermediary between the cardholder (or other financial account holder) and a recipient of a payment or fund transfer desired by the cardholder, such as in association with a transaction to purchase goods or services. Individual ones of payment systems 140 may be associated with specific merchants, specific financial institutions, specific credit card types, and/or may be configured to individually handle payments of many different types, sources and recipients.

The one or more video hosting platforms 160 may be network-based services for hosting digital video content for on-demand and/or streaming access from individual client devices 110. Video content hosted by a given video hosting platform may be uploaded by various content creators or owners (e.g., individual users or entities, depending on the given host). Examples of video hosting platforms 160 may include services hosting or providing access to social media content, user-generated content, professionally produced movies or shows, live steaming video (which may include live streaming of video game play, professional sports, concerts, and/or other events), and/or other video content. It will be appreciated that any individual video hosting platform 160 need not provide video hosting as its primary focus. For example, a social media service that provides its users with access to user-uploaded or live-streamed video content in addition to various text posts, images, and other content may be considered a video hosting platform, in some embodiments. Similarly, a content delivery network (CDN) that hosts various types of content other than just video content may also be considered a video hosting platform, in some embodiments.

The one or more third party shopping systems 120 may be services, systems or platforms that enable individuals or business entities to establish virtual storefronts or listings for products and/or services available for sale to consumers. Such services may each offer a different API 122 that enables systems, such as in-video shopping system 130, to retrieve details regarding these product listings (such as an item identifier, item title, images, descriptions, prices, availability, reviews, available colors, sizes or other configurations, etc.), and may also enable purchase of the items on behalf of the seller or storefront owner. One or more of the shopping systems 120 may be operated by specific retailers or merchants that enable other users or companies to serve as marketing affiliates. Other ones of shopping systems 120 may be considered e-commerce platforms for handling or assisting with various operations for hundreds or thousands of different businesses, individual sellers, or merchants' products and/or services, such as assisting with payments, marketing, shipping, shopping interfaces, and/or customer engagement tools.

FIGS. 2A, 2B, 2C, 2D, 2E, 2F and 2G illustrate a sequence of user interfaces in which various user selections are made in a shopping overlay displayed over video content, such that a user may browse and purchase at least one product entirely within the overlay without being redirected or disrupting video playback. The sequence begins with FIG. 2A, in which a page or user interface 204 is presented for display to a user via a browser 202, which may be executed by one of client computing devices 110. The page data (shown as associated with a URL "http://www.example-.com") may have been requested by the client device from a server, such as one of website publisher systems 150. Code of the page 204 may have included a reference to a video 206A embedded within the page 204. The video file may have been retrieved by the client device from a URL associated with the website publisher (or an associated CDN) or a third-party video hosting platform 160. More details regarding enabling a publisher to integrate a video and a shopping overlay into a page or other user interface will be further described below with respect to the illustrative flow diagrams.

Figure 2A:
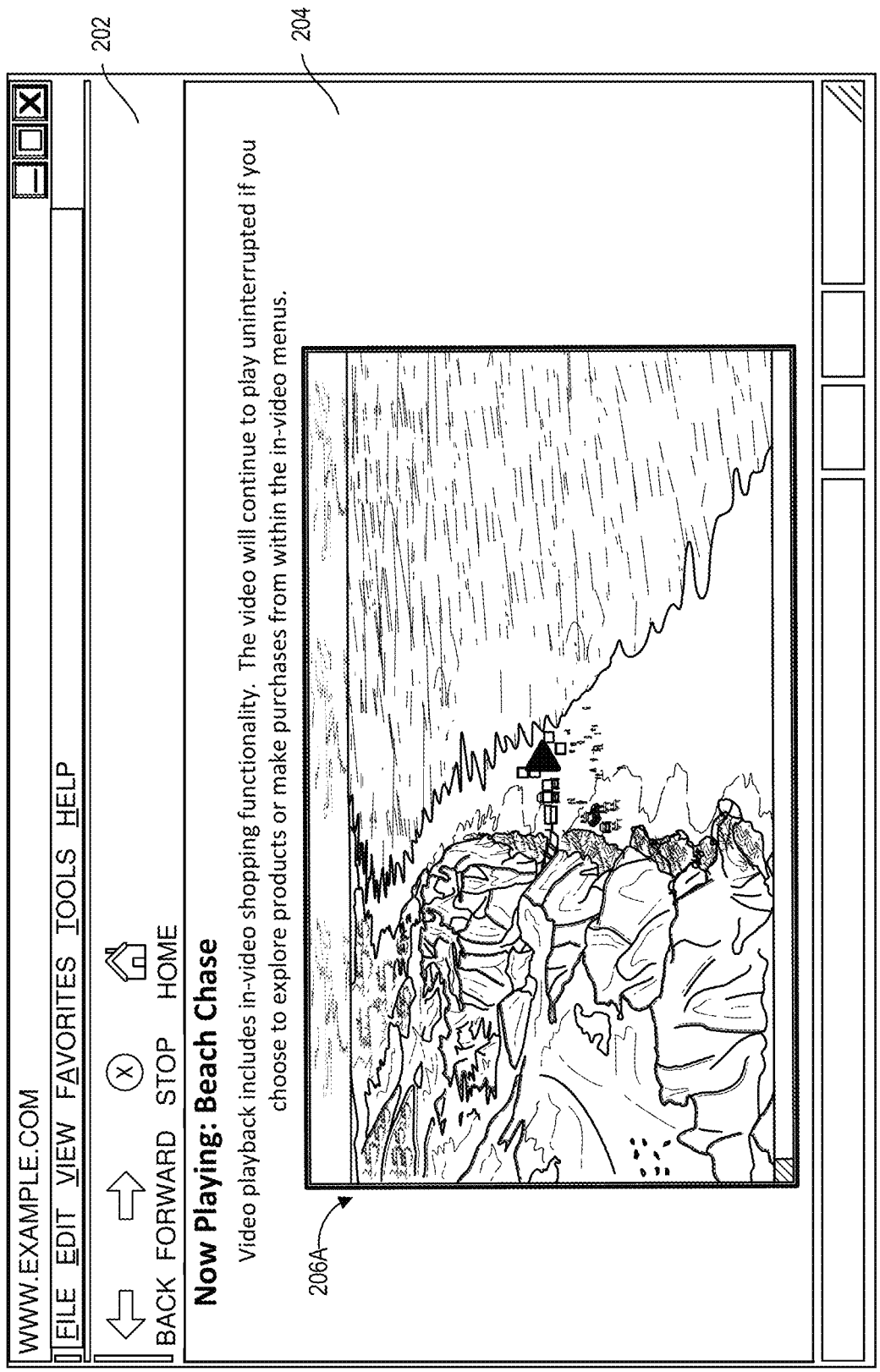
FIGS. 2A, 2B, 2C, 2D, 2E, 2F and 2G illustrate a sequence of user interfaces in which various user selections are made in a shopping overlay displayed over video content, such that a user may browse and purchase at least one product entirely within the overlay without being redirected or disrupting video playback.
Figure 2B:
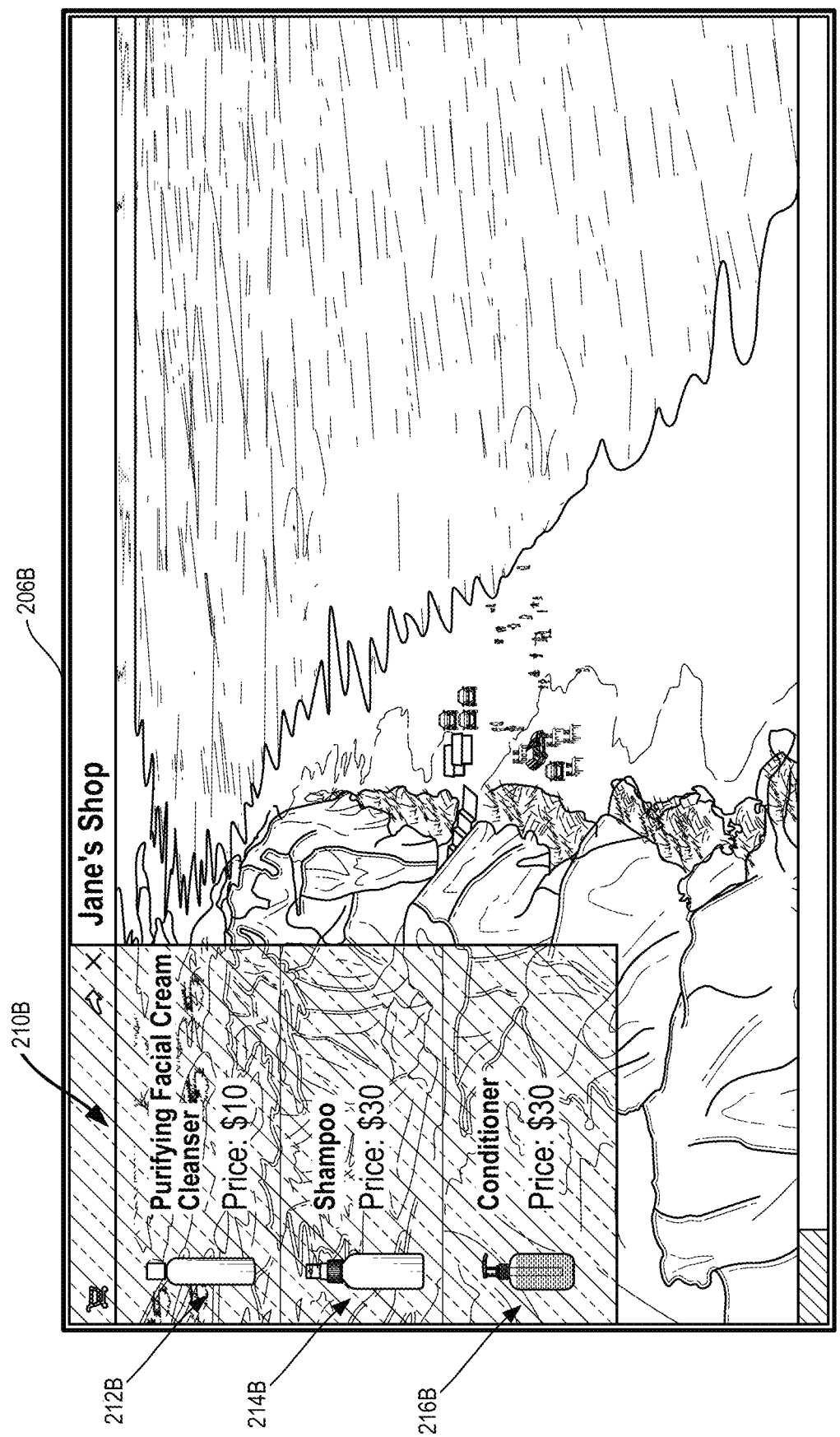

FIG. 2B is an illustrative user interface in which an interactive shopping overlay 210B has been presented to appear on top of underlying video content 206B. In some embodiments, FIG. 2B may represent a video portion of a larger user interface of page (such as corresponding to the space occupied by video 206A in page 204 of FIG. 2A). In another embodiment, FIG. 2B may occupy the entire screen of a user device, such as if the user selects to view a video in a full screen mode. The interactive overlay portion 210B of the interface includes display of three items 212B, 214B and 216B, which each represent products available for purchase by the viewing user. The overlay portion 210B may be displayed while the video content 206B continues to play and progress behind the displayed overlay portion.

The diagonal hatch pattern shown within the overlay 210B may not be actually displayed as shown to the user, but rather represents a partially transparent or translucent background color, image or pattern that may appear to be a layer between the items (212B, 214B, and 216B) and the video content. Accordingly, in the illustrated embodiment, portions of the video content may remain at least partially visible beneath portions of the partially translucent overlay 210B. Similarly, the overlay portion may be an irregular shape (such as having curves or interior blank portions), such that portions of a rectangle that defines the overlay layer are entirely translucent. In other embodiments, the overlay content may include an opaque background. Each of the items shown as items 212B, 214B and 216B may be selectable options that the user may interact with via a cursor, touchscreen or other interaction in order to learn more information about an item or add it to an electronic shopping cart without affecting playback of the video content 206B or changing any portion of the user interface outside of overlay 210B.

While the interactive shopping overlay 210B has been presented to appear on top of underlying video content 206B in FIG. 2B, other arrangements of the interactive shopping overlay relative to the underlying video content are possible in other embodiments. For example, products or other items shown within an interaction layer may appear adjacent to the underlying video content (such as above, below, to the left and/or to the right of the video content) or framing the video content along two or more edges. In some such embodiments, the interactive overlay may at least partially overlay content outside of the portion of the user's screen that displays the video content, such as covering or partially covering a portion of a webpage or other application's interface in which the video player is embedded. Accordingly, in some embodiments, the screen space occupied by the collective content of the shopping overlay and the underlying video content may exceed the screen space that would otherwise be occupied by only the video content. In the embodiment shown in FIG. 2B, in contrast, the screen space occupied by the collective content of the shopping overlay and the underlying video content is not any larger than the screen space that would otherwise be occupied by just the underlying video content alone.

Figure 2C:
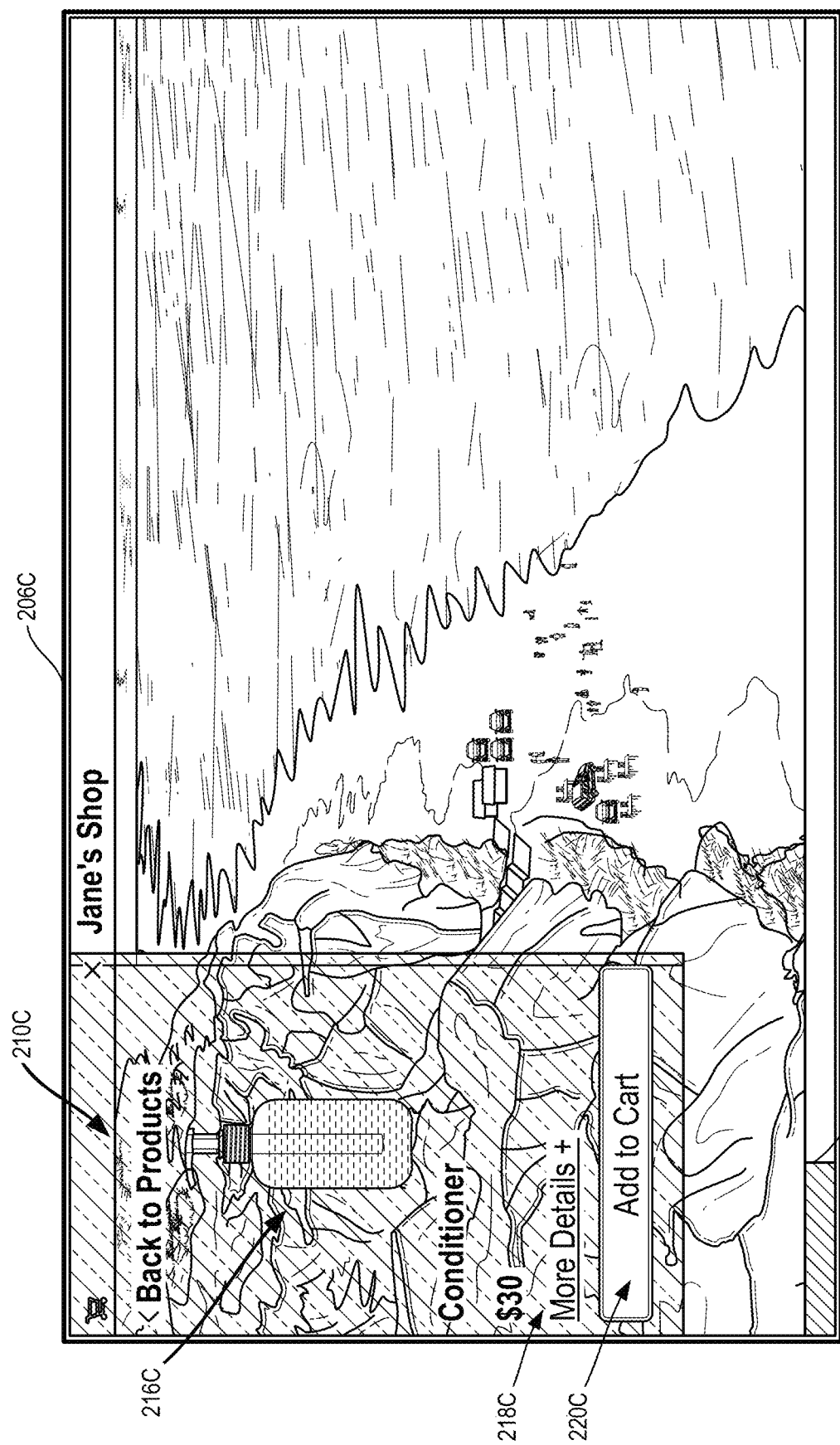

FIG. 2C is an illustrative user interface in which an interactive shopping overlay 210C appearing over underlying video content 206C has been updated to display product details for an item 216C. The interface shown in FIG. 2C may be presented after the user has selected (such as via a click or touch action) the item 216B of FIG. 2B, which the user may have selected because the user is interested in potentially purchasing the "conditioner" item 216C. As illustrated by the video progress bar 221, the progress of video playback of video content 206C has continued to progress relative to the prior figure (and, as will be seen in subsequent figures, will continue to progress throughout the purchase sequence ending in FIG. 2G). The user may select the selectable "more details" option 218C in order for the overlay 210C to be updated with display of additional text or images regarding the item 216C. The user may select "add to cart" option 220C in order for the user's device to initiate addition of the item 216C to an electronic shopping cart maintained either on the client's device (e.g., as may be stored locally in association with a cookie) or remotely at the in-video shopping system 130, depending on the embodiment.

Figure 2D:
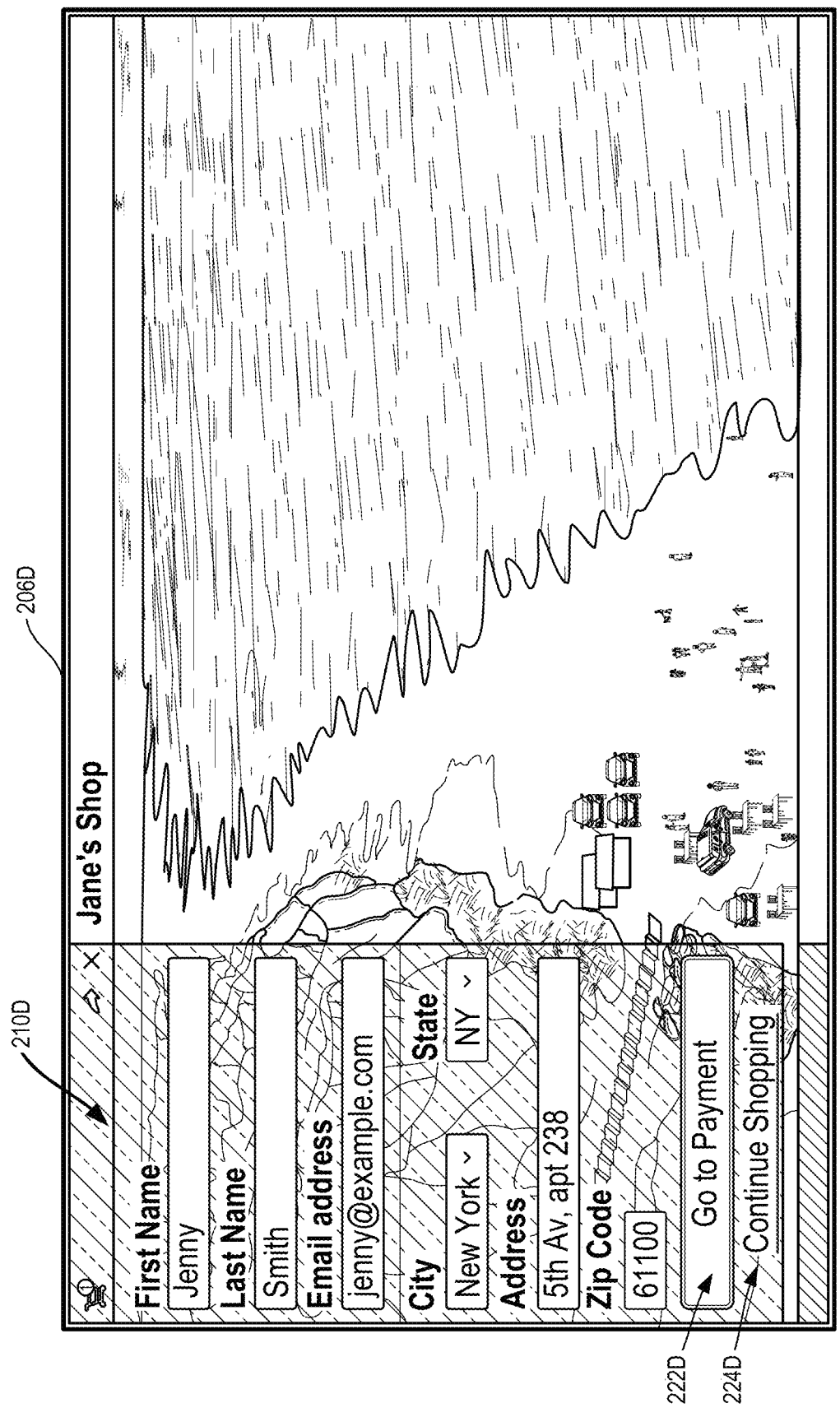

FIG. 2D is an illustrative user interface in which an interactive shopping overlay 210D appearing over underlying video content 206D has been updated to display a checkout form in which a user may enter various information within designated fields (such as name, email address, and mailing address) to be used for a purchase. The interface shown in FIG. 2D may be presented after the user has selected (such as via a click or touch action) the option 220C of FIG. 2C. The video content 206D may continue to progress in playback as the user types within the form. In other instances, the user may not be prompted to enter personal or billing information prior to order checkout, such as in instances in which the user is logged into an account with the in-video shopping system 130 or a payment provider system 140, and such information has been previously stored in association with the account. The user may select option 222D in order to progress the overlay content to a payment step, or may select option 224D to return to other product listings (such as if the user is not interested in completing a purchase at the moment or would like to add an additional item to the shopping cart). The video content 206D may continue to play uninterrupted in response to any of these user actions.

Figure 2E:
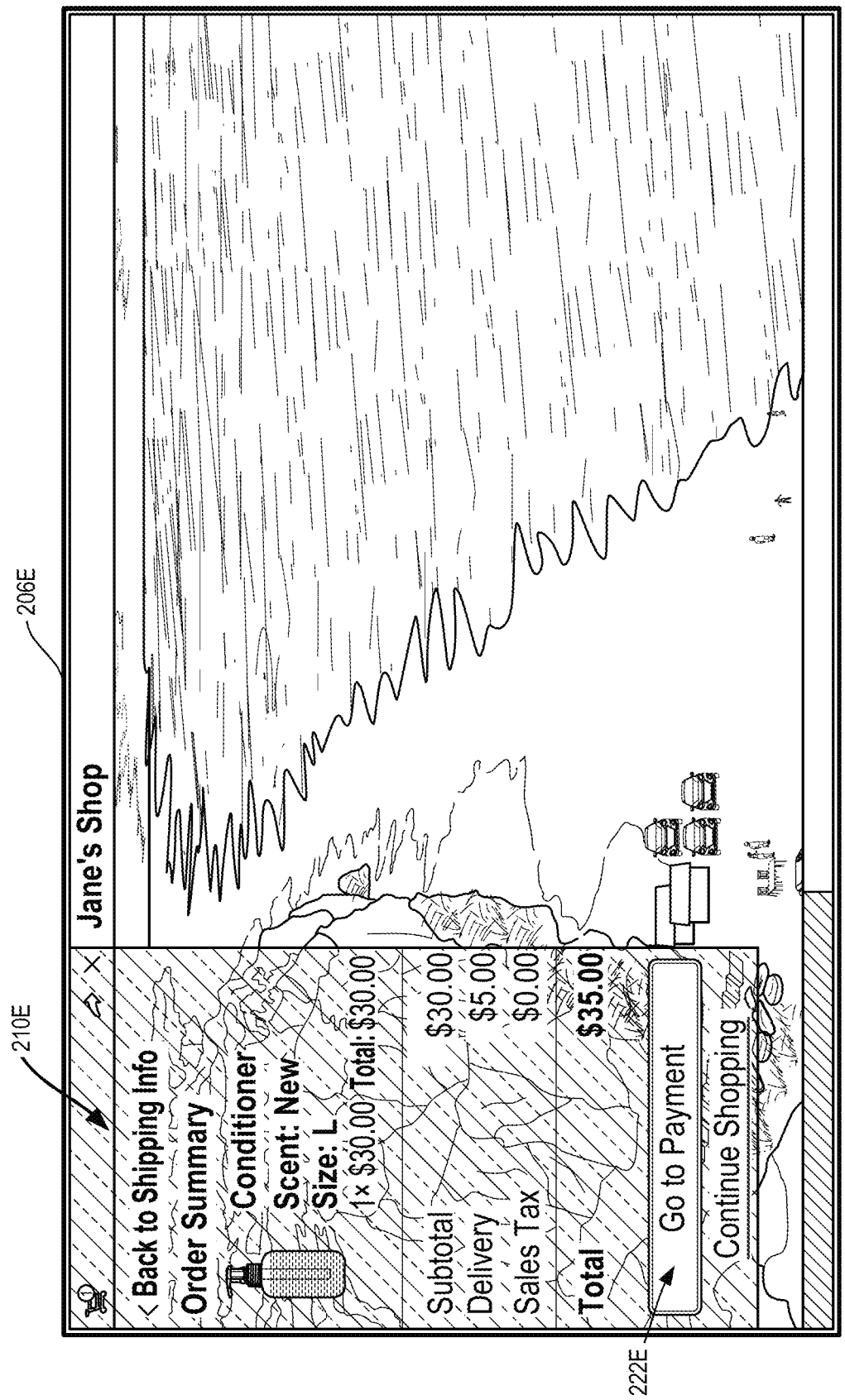

FIG. 2E is an illustrative user interface in which an interactive shopping overlay 210E appearing over underlying video content 206E has been updated to display an order summary including one item to be purchased. The interface shown in FIG. 2E may be presented after the interface of FIG. 2D while the video content continues to play. Upon user selection of "go to payment" option 222E, the interface may update to appear as shown in FIG. 2F.

Figure 2F:
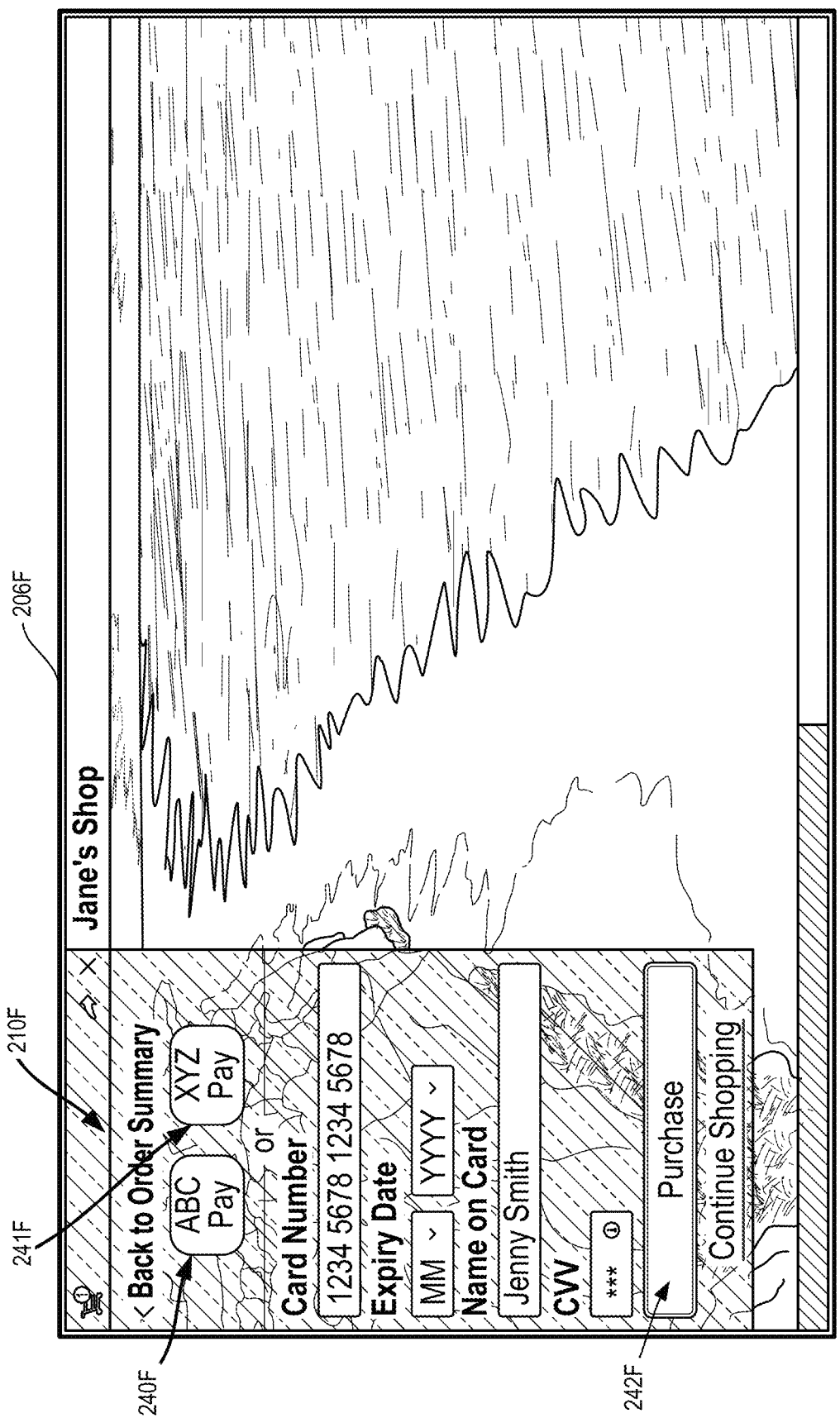

FIG. 2F is an illustrative user interface in which an interactive shopping overlay 210F appearing over underlying video content 206F has been updated to display options for the user to select or enter payment information. The user may alternatively type in credit card details (such as typing in text fields for the card number, selecting pull-down menu options for card expiration date, etc.), or may select one of "ABC Pay" option 240F or "XYZ Pay" option 241F. Options 240F and 241F may correspond to two different third-party payment processing services, which may be associated with different ones of third party payment systems 140. Selection of ABC Pay option 240F may enable the user to pay for the order via a third party payment service named ABC Pay, with which the user may have previously established an account and associated credit card payment details. More details regarding system interactions for completing an in-video order using a third party payment service will be described below with respect to FIG. 6. Once the user has selected or entered payment method details, the user may select the purchase option 242F to complete the purchase entirely within the in-video overlay 210F and without interrupting display and playback of the video content 206F.

Figure 2G:
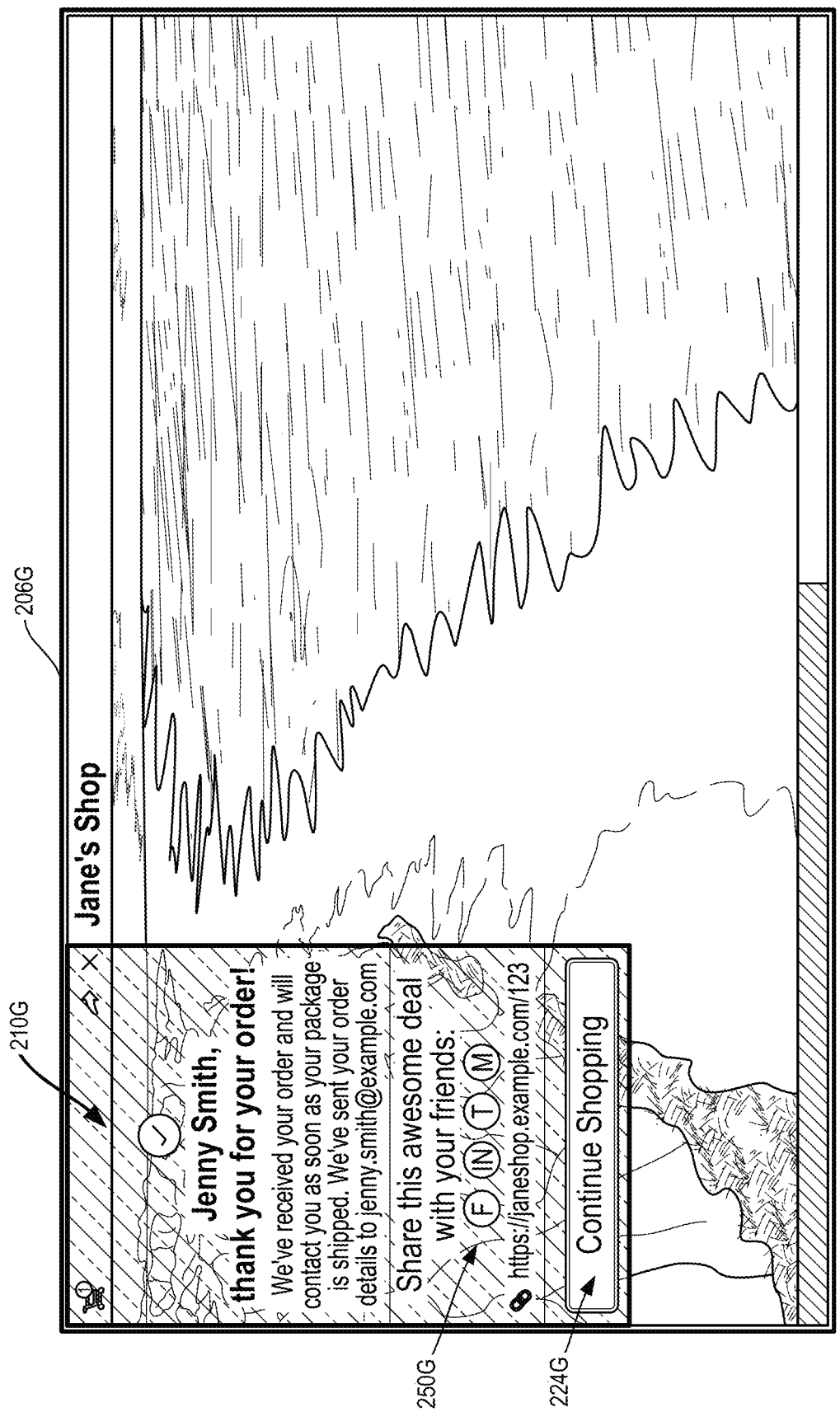

FIG. 2G is an illustrative user interface in which an interactive shopping overlay 210G appearing over underlying video content 206G has been updated to display an order confirmation indicating that the user has successfully purchased one or more items via previous user selections that occurred within the interactive shopping overlay while the video content 206G played. The user may select social sharing options 250G to cause the in-video shopping system 130 to initiate a message or post within any of various social media services on behalf of the purchasing user to share information about the item(s) purchased and corresponding sale information. The user may select option 224G to return to see additional item information for other items that may be purchased during the remainder of the video content 206G.

Various examples shown in FIGS. 2A-2G and described above may be implemented with respect to either video on demand (VOD) content or live streaming content. For example, the various content shown within the interactive shopping overlay of any of FIGS. 2A-2G may be presented based on pre-determined timestamp information (such as time markers within a video file that a publisher or other entity associated with specific items), or may be presented based on instructions received from a server in real time that indicate when a live streaming source device indicated that a particular item should be shown to viewers (such as in association with the method described below with respect to FIG. 8).

Figure 3:
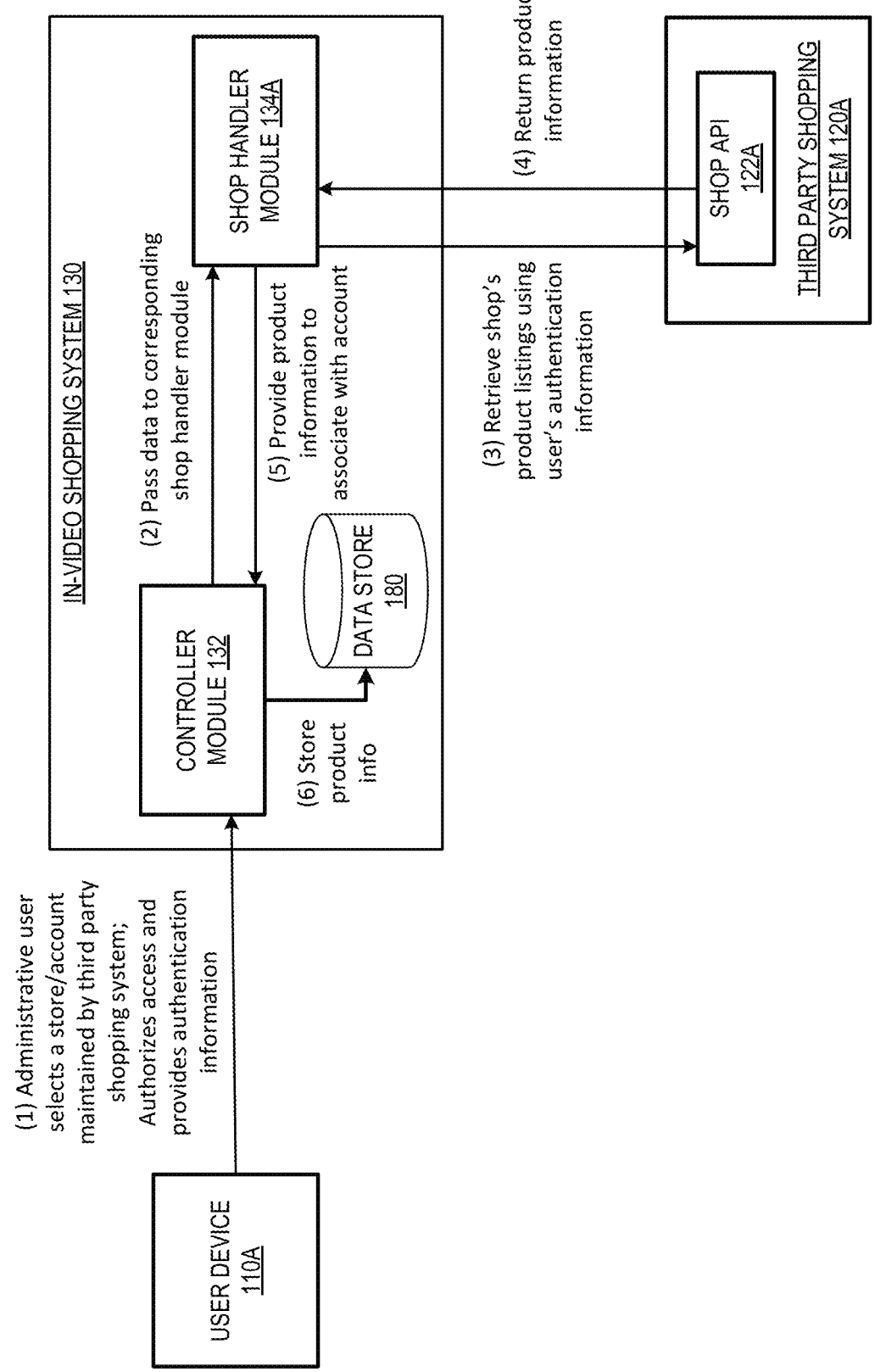
FIG. 3 in an illustrative flow diagram for enabling a user to associate items from a third party shopping system that the user wishes to offer to video viewers via an in-video shopping service.

FIG. 3 in an illustrative flow diagram for enabling a user to associate items from a third party shopping system that the user wishes to offer to video viewers via an in-video shopping service. The user of user device 110A may be, for example, an individual (who may be an administrative user acting on behalf of an organization or corporate entity) that wishes to enable overlay video functionality within one or more webpages or user interfaces that the individual or associated entity makes accessible to others (such as a publicly available website). The user may have previously set up a virtual store or item list with a third party shopping system 120A, which maintains items information for one or more products, services or other items that the user would like to offer in association with an in-video shopping feature. In other embodiments than that illustrated in FIG. 3, the in-video shopping system 130 may maintain item lists and/or virtual store data itself without communicating with any third party shopping system.

At step (1) of FIG. 3, the user device 110A may send an indication to the in-video shopping system 130 of a user selection of a virtual store and/or account of the user (or organization or entity that the administrative user represents) maintained by the third party shopping system 120A. The information or data sent at step (1) may further include approval and/or authorization information from the user of the user device 110A for the in-video shopping system 130 to access the desired item information from the third party shopping system 120A. For example, the authorization information may include login credentials for an account of the user with the third party shopping system 120A, and/or a token or identifier associated with the shop API 122A that identifies the user's account and/or a particular virtual store or list of items (such as specific products identified by item identifiers) set up by the user.

Next, at step (2) of FIG. 3, the controller module 132 of the in-video shopping system 130 may pass the received data from step (1) to the shop handler module 134A. The controller module may select the specific shop handler module 134A as the appropriate shop handler module (for the selections made by the user) from among a number of shop handler modules that are each configured to communicate with different shopping systems' APIs. At steps (3) and (4), the shop handler module 134A of the in-video shopping system 130 may send one or more API calls to the shop API 122A of the third party shopping system 120A to obtain the virtual store's product listings (or other item listings, such as services or digital content items) using the user's authentication information received at step (1). Depending on the specific shopping system and/or the nature of the specific items (e.g., whether they are services, physical products, digital content items, etc.), the item information returned at step (4) may include, for each individual item, an item title, item description, price, quantity available, images (which may be returned as image files, image identifiers, or URLs of image files), other media (such as interactive demo content, video, etc.), various attributes specific to the type of item (e.g., size options for clothing, page count for books, color options, etc.), brand, manufacturer, and/or other data.

At step (5) of FIG. 3, the shop handler module 134A provides the item information received from the shop API 122A to the controller module 132 to associate the item information with the user's account with the in-video shopping system 130. The controller module 132 may then at step (6) store the item information in association with the user's account in electronic data store 180, which may be local to or remote from the in-video shopping system 130.

Though not illustrated in FIG. 3, in some embodiments, the in-video shopping system 130 may then provide one or more user interfaces to the user device 110A that enable the user to select individual ones of the items to associate with in-video shopping options. For example, the user may provide the in-video shopping system 130 with a URL of a video hosted by a video hosting platform (or may upload a video for hosting by the in-video shopping system 130), and may associate individual ones of the items from shop API 122A with specific time markers in the video (such as by associating an individual item with a start time and optional end time for presentation within the playback time of the video). User interfaces and methods for associating items with specific time markers in a video file are further described in co-owned U.S. patent application Ser. No. 15/974,554, entitled "SYSTEMS AND METHODS FOR PROVIDING AN ENHANCED SHOPPING EXPERIENCE INCLUDING EXECUTABLE TRANSACTIONS AND CONTENT DELIVERY." For example, a user interface may enable a user to drag an icon representing an item to a position on a time bar of the video, may enable the user to select an "add now" option associated with an item during playback of the video on the user device 110A, may enable the user to enter a start and/or stop time as text or from a pull-down menu, and/or other options. Specific interfaces for associating items with time positions in a video or in real time during live streaming are further described below with respect to FIGS. 7A and 7C.

In other embodiments, products or other items may be associated with portions of a video or time stamps within a video based on an automated analysis of the video and/or metadata associated with the video. For example, the in-video shopping system 130 or another computer system may include one or more machine learning models configured to accept video or image data as input (such as image data from individual frames within the video) and to detect the appearance of specific products or other objects of interest within the video. The machine learning model(s) may be trained using known methods for object detection and/or classification of image data, and may include a deep learning model and/or convolutional neural network. In some embodiments, shop owners, publishers, video rights holders, an operator of the in-video shopping system and/or others may associate given products or other items with a list of keywords or objects (e.g., "soda," a brand name, "sunglasses," etc.) such that the given item will be associated by the in-video shopping system with time markers in a video at which a machine learning identifies the presence of an object within the video matching the keyword. In other embodiments, a classifier or other machine learning model may be trained to identify the appearance of specific products in a video (e.g., to identify that a specific item of clothing by a certain brand, which is available for purchase via a third-party shopping system 120, is shown in a certain video frame or portion). The association of items with specific time markers in the video at which an object appears within the video content may be performed in a batch process or otherwise in advance of video playback on user devices (such as processing new videos at a server using a machine learning model when or soon after a publisher selects to associate an embed code with a given video), or may be performed during video playback based on sample frames and/or metadata provided for analysis to the in-video shopping system during a user's viewing of a video.

Figure 4A:
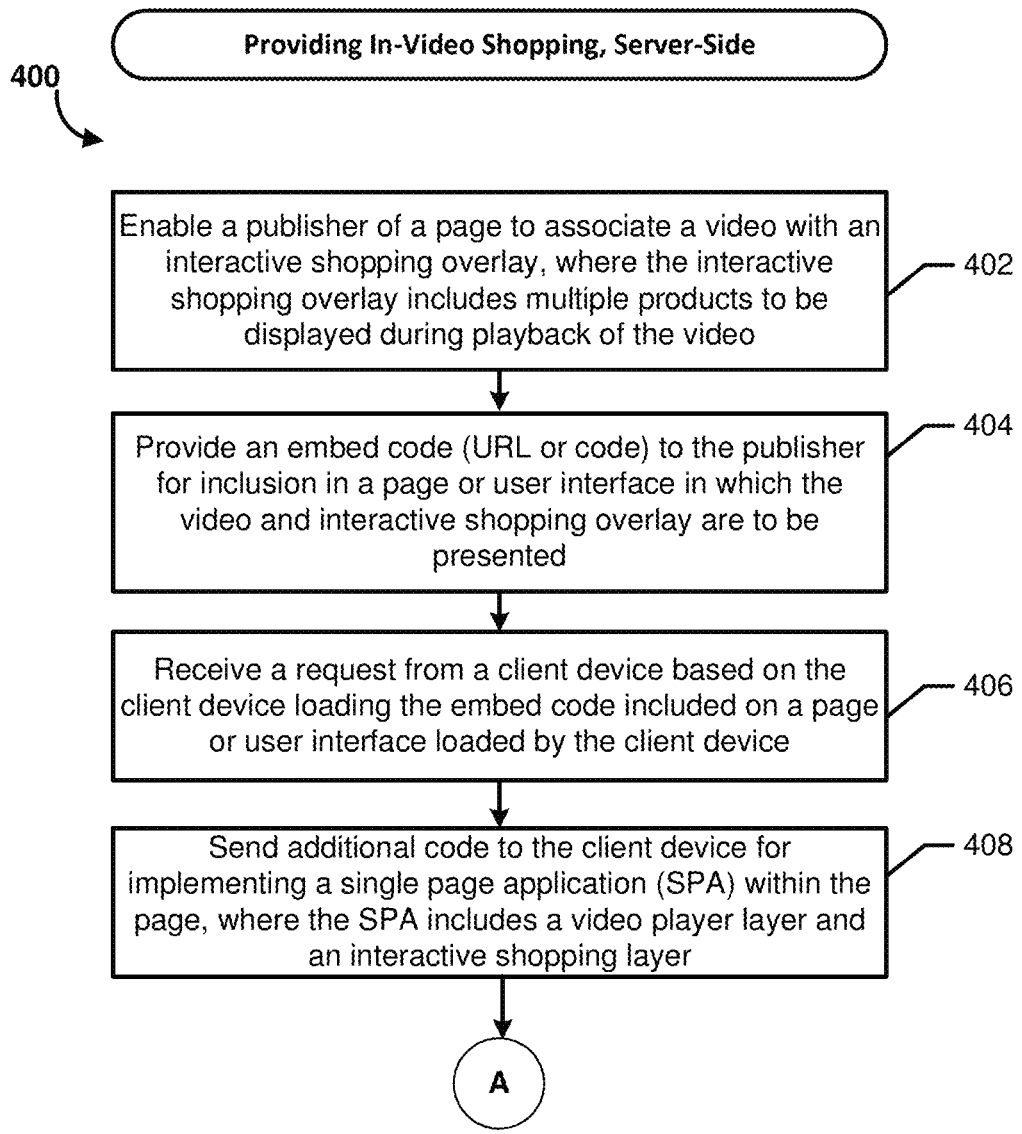
FIGS. 4A and 4B are flow diagrams of an illustrative method for providing in-video shopping functionality, as implemented by one or more servers, according to some embodiments.
Figure 4B:
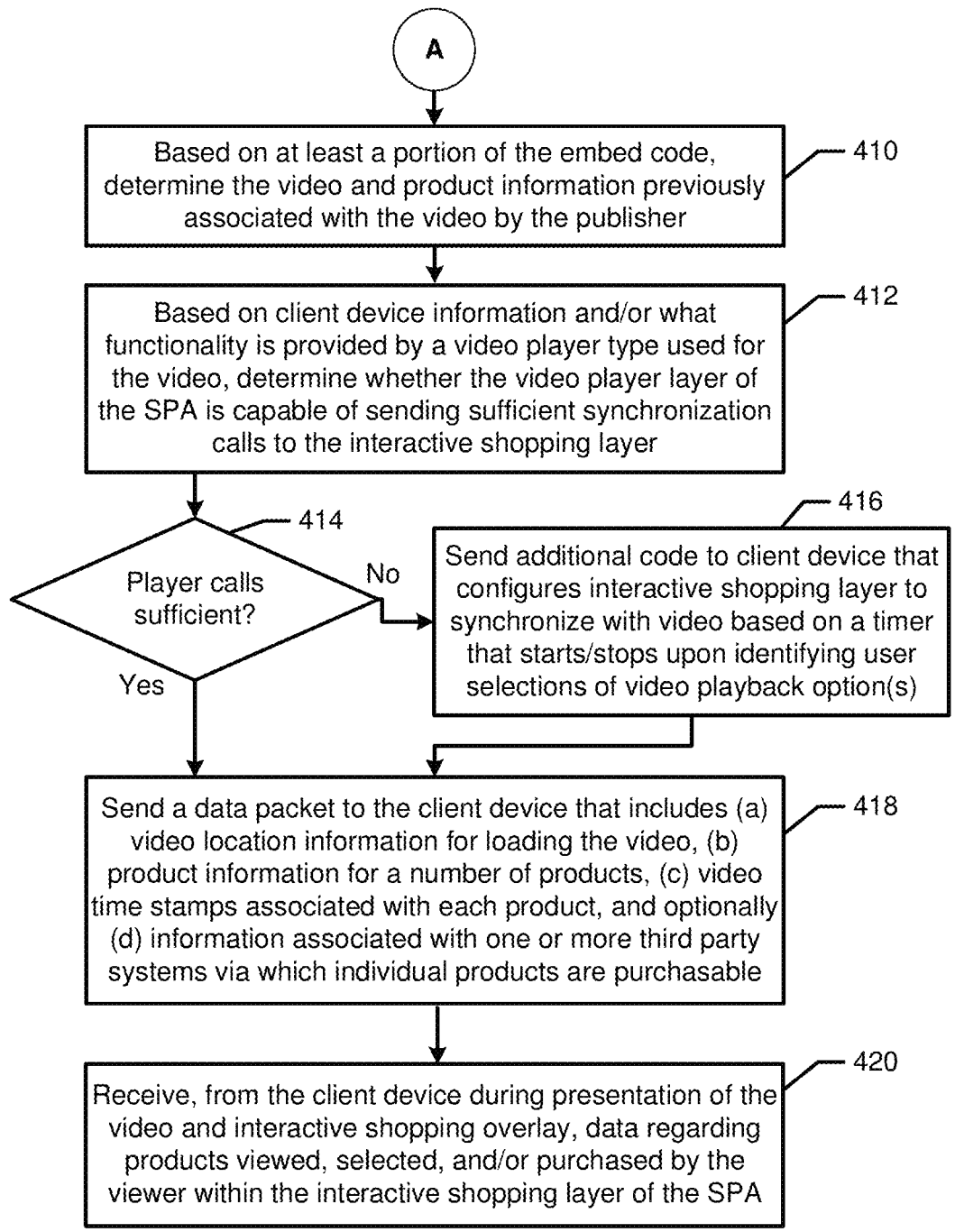

FIGS. 4A and 4B are flow diagrams of an illustrative method 400 for providing in-video shopping functionality, as implemented by one or more servers or other network-accessible computing systems, according to some embodiments. Illustrative method 400 will be described below as implemented by the in-video shopping system 130. In other embodiments, one or more blocks of FIGS. 4A and/or 4B may be implemented by a computing system other than the in-video shopping system 130.

The illustrative method 400 begins at block 402, where the in-video shopping system 130 may enable a publisher of a page (such as a webpage) or other user interface (such as an interface to be presented by a proprietary mobile application or other software application associated with the publisher) to associate a video with an interactive shopping overlay. The interactive shopping overlay may be configured by the in-video shopping system 130 based on input from the publisher to include multiple products or other items to be displayed during playback of the video. Methods for associating items with time markers in a video are described further both above and below.

Next, at block 404, the in-video shopping system 130 may provide an embed code (or alternatively a URL or code) to the publisher for inclusion in one or more pages or user interfaces in which the video and interactive shopping overlay are to be presented. The embed code may be, for example, a line or block of Hypertext Markup Language (HTML) that the publisher may copy and paste into HTML code of the publisher's page. In other embodiments, the code provided at block 404 may include content other than pure HTML, such as JavaScript. In some embodiments, the provided code may include an <iframe> tag (referred to as an iframe or inline frame). The embed code or other code that is provided at block 404 for the publisher to include in their page(s) may further include one or more unique identifiers that identifies the particular interactive content set (such as the video and items) that the publisher wishes to provide to users at the point in which the code is included in a page.

For example, the one or more unique identifiers may be used by the in-video shopping system 130 to determine which video is to be shown, which items to present in an interactive overlay on the video, the specific publisher account, and/or other information. In some embodiments, a single unique identifier (such as a number or alphanumeric string) is generated by the in-video shopping system 130 at or prior to block 404 to be universally unique among all identifiers generated by the in-video shopping system 130 to that point, and may store the unique identifier (which the in-video shopping system 130 includes in the custom embed code provided to the publisher) in a data store in association with the video URL, item information, and item time markers selected by the publisher. In this manner, the in-video shopping system 130 may later retrieve the specific video and item information from a data store in response to requests from client devices that include the given unique identifier.

At block 406, the in-video shopping system 130 may receive a request from a client device based on the client device loading the embed code included on a page or user interface loaded by the client device. For example, a browser or other application operating on the client device may have accessed a page from a server of the publisher system (e.g., a page in which the publisher that set up the interactive shopping overlay at block 402 included the embed code provided at block 404), loaded the initial page code (such as HTML), and sent a request to the in-video shopping system 130 (or an associated server) as a result of interpreting the embed code within the initial page code. The request received at block 406 by the in-video shopping system 130 may include the one or more unique identifiers that the in-video shopping system 130 previously included in the embed code provided to the publisher.

At block 408, the in-video shopping system 130 may send additional code to the client device for implementing a single page application (SPA) within the page, where the SPA includes a video player layer and an interactive shopping layer. In some embodiments, the interactive shopping layer may be considered more broadly to be an interactive content layer or portion. The additional code sent at block 408, in one embodiment, may be code that when executed or interpreted by an application (such as a browser) operating on the client device, causes (a) generation of a video player layer within the page (such as a second inline frame), wherein the video player layer is positioned beneath an initial layer associated with the embed code (such as an initially loaded inline frame) included in the initial page code, and further causes (b) initialization of an interactive content portion within the initial layer. The interactive content portion may be configured by the additional code to display interactive content over the video player layer based at least in part on communications between a video player component within the video player layer and code associated with the interactive content portion. In other embodiments, a video player layer may be initially loaded at the client device, then modified by additional code received from the in-video shopping system 130 that causes overlay content to be presented within the video player layer itself without necessarily requiring a second layer to be generated or created. For example, a software development kit (SDK) or library provided by a given video player may be used by code delivered from the in-video shopping system 130 to present interactive overlay content within the content presented by the video player itself rather than a separate iframe or other layer loaded above the video player layer.

At block 410 of FIG. 4B, which may occur after block 408 of FIG. 4A, the in-video shopping system 130 may determine, based on at least a portion of the embed code, the specific video and item information previously associated with the video by the publisher. For example, as mentioned above, the in-video shopping system 130 may extract or identify the unique identifier from the embed code, and use the unique identifier to retrieve a video URL or other video identifier previously associated with the unique identifier, as well as the item information previously associated with the unique identifier. In other embodiments, multiple identifiers may be included in the embed code (such as a publisher identifier identifying the publisher, a store identifier identifying a third party virtual store, and/or a video identifier, etc.). The in-video shopping system 130 may be configured to operate in association with any of a number of different video hosting platforms, such that the video URL may reference a file location or stream location controlled by any of a number of different third parties, each of which may employ different video player modules or video player components to play videos on a client device.

At block 412, the in-video shopping system 130 may determine whether the video player layer of the SPA is capable in the given instance of sending sufficient synchronization calls to the interactive shopping layer. This determination may be made, in some embodiments, based on client device information regarding the particular client device (e.g., the device type, operating system type, browser type, browser configuration settings, etc.) and/or what functionality is provided by a video player type used for the particular video (e.g., the specific video player code or module utilized by a given video hosting platform that hosts the video). In some embodiments, the minimum calls that the in-video shopping system 130 may check for with respect to the video player include the capability of the video player to send time-based events or enabling the interactive shopping layer to listen for synchronization events generated by the video player. For example, a sufficiently configured video player in one embodiment may include a library or set of function calls that include the video player implementing an event listening function or other synching function, such as sending a signal each second of video playback. Alternatively, a sufficiently configured video player may provide functions for the in-video shopping system 130 to query the video player to determine a current playback position (such as a time position in minutes and seconds) of the video. In some embodiments, the in-video shopping system 130 may have previously associated specific video players or video hosting platforms with a Boolean value indicating whether workaround code should be sent to client devices to support synchronization between the video player layer and the interactive content layer (such as the code sent at block 416 below). In other embodiments, the determination may be made dynamically in a given instance by the in-video shopping system 130 and/or the client device based on attempting to execute test code at the client device.

If the in-video shopping system 130 determines at decision block 414 that the video player's library or supported calls are sufficient, the method proceeds to block 418 without implementing block 416. Otherwise, the method may first proceed to block 416, where the in-video shopping system 130 may send additional code to the client device that configures the interactive shopping layer to synchronize with the video based on a timer that starts and stops upon identifying user selections of video playback options. For example, this additional code may cause the client device to start a timer upon a user selecting a "play" option in the video player, and the timer may be configured to run while no user selections are made with respect to video player controls, but to pause upon a user selection of a "pause" option in the video player, such that the running timer count very closely approximates the current playback position in the video (such as within a second or a few seconds). For example, the additional code may identify or listen for click-based (e.g., based on a mouse click when the cursor is within a certain portion of the page associated with video player controls) or touch-based events (based on a touch on a touchscreen within a certain portion of the page associated with video player controls). The additional code may further listen for or identify other manners of the user playing or pausing the video, such as a certain keystroke associated with playback commands in the given video player (such as the user pressing the space bar on a keyboard to play or pause the video).

At block 418, the in-video shopping system 130 may send a data packet to the client device that includes (a) video location information for loading the video, such as a URL, (b) item information for each of a plurality of items to be presented at various points during the video, (c) video time stamps associated with each of the individual items (unless such time stamps will be sent in real time, as described below), and optionally (d) information associated with one or more third party commerce systems via which individual products are purchasable (such as a third party payment processor and/or shopping system). The previous code sent to the client device or additional code sent at block 418 may be configured to (i) interpret the data packet to obtain the video from the URL or other network location, (ii) cause presentation of the video by a video player component within the video player layer (where the video player code may be sent to the client device by the host of the video URL), and (iii) present at least a portion of the item information in the interactive content portion within the initial layer at a first playback time based at least in part on synchronized communications between the video player component within the video player layer and the code associated with the interactive content portion.

In some embodiments other than that shown in FIGS. 4A and 4B, the client device may have the video player, the video location information and/or have already loaded the video for playback prior to sending any initial request to the in-video shopping system 130. For example, in some embodiments, code already resident on the client device prior to accessing the page or other user interface, or included within the initial page code, may directly reference the video location. Alternatively, the video may be a video file accessed locally at the client device for playback. In such cases, the initial request from the client device to the in-video shopping system 130 may be for overlay content as opposed to both overlay content and video information. Accordingly, in such embodiments, the data packet (similar to that sent at block 418) need not include video location information or even any video identification information at all.

At block 420, the in-video shopping system 130 may receive, from the client device during presentation of the video and interactive shopping overlay on the client device, data regarding products or other items viewed, selected, and/or purchased by the viewer within the interactive shopping layer of the SPA. Such information may be later used by the in-video shopping system 130 to present metrics or data to the publisher regarding users' interactions with, and viewing of, content within video shopping overlays. Additionally, the in-video shopping system 130 may receive real time indications from the client device of user selections within the interactive shopping portion that cause updates to the displayed content in the interactive shopping portion (such as showing additional item details, adding an item to an electronic shopping cart or other saved item list, purchasing an item, etc.), as will be further described below with respect to other figures.

It will be appreciated that certain blocks of method 400 described above may be implemented in a different order than illustrated, in other embodiments. For example, the additional code sent at block 408, the additional code sent at block 416 and/or the data packet sent at block 418 may be sent in a different order relative to one another, or two or more of these may be sent together in a single communication (such as parts of a single object, package or file).

Figure 5A:
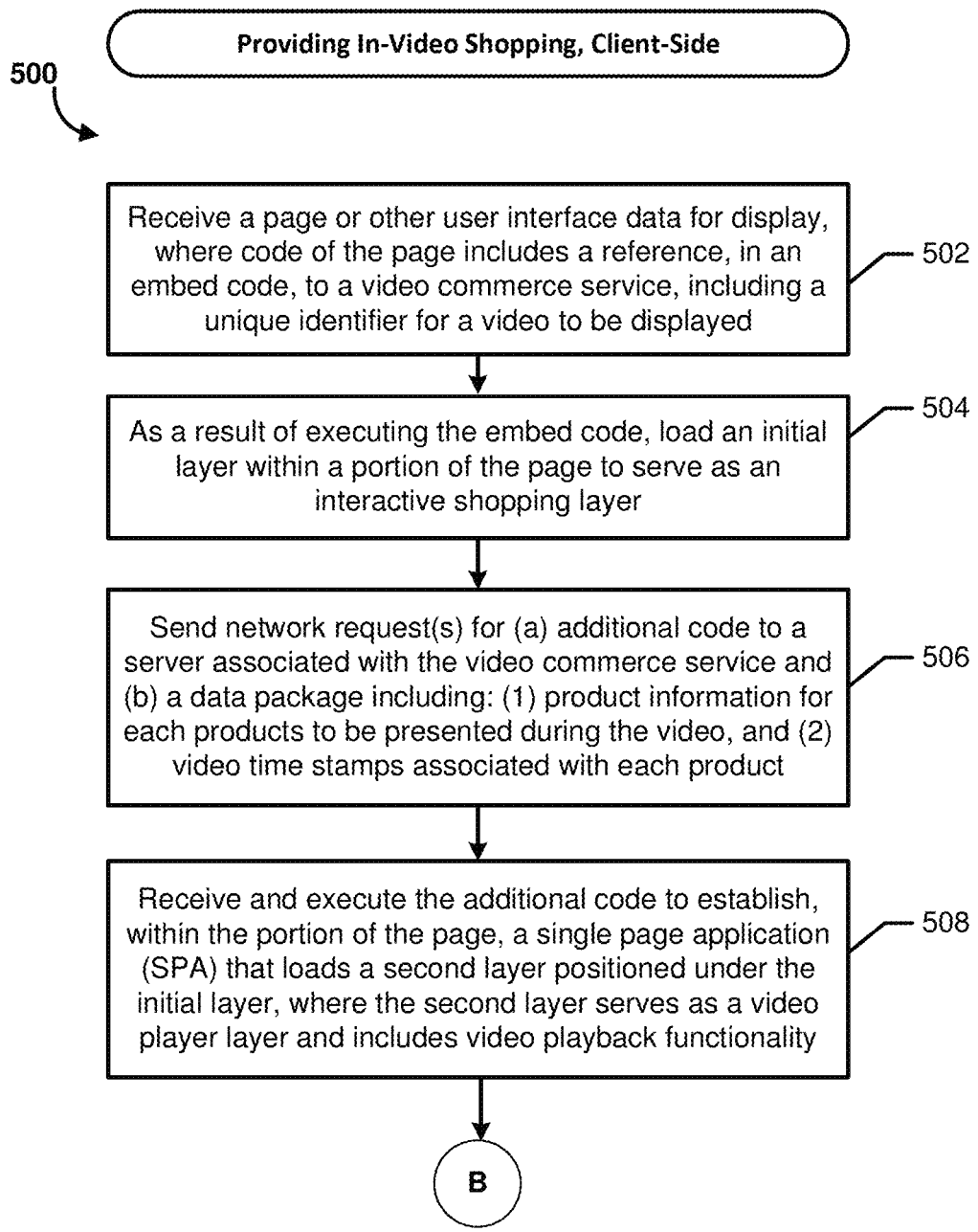
FIGS. 5A and 5B are flow diagrams of an illustrative method for providing in-video shopping functionality, as implemented by a client device, according to some embodiments.
Figure 5B:
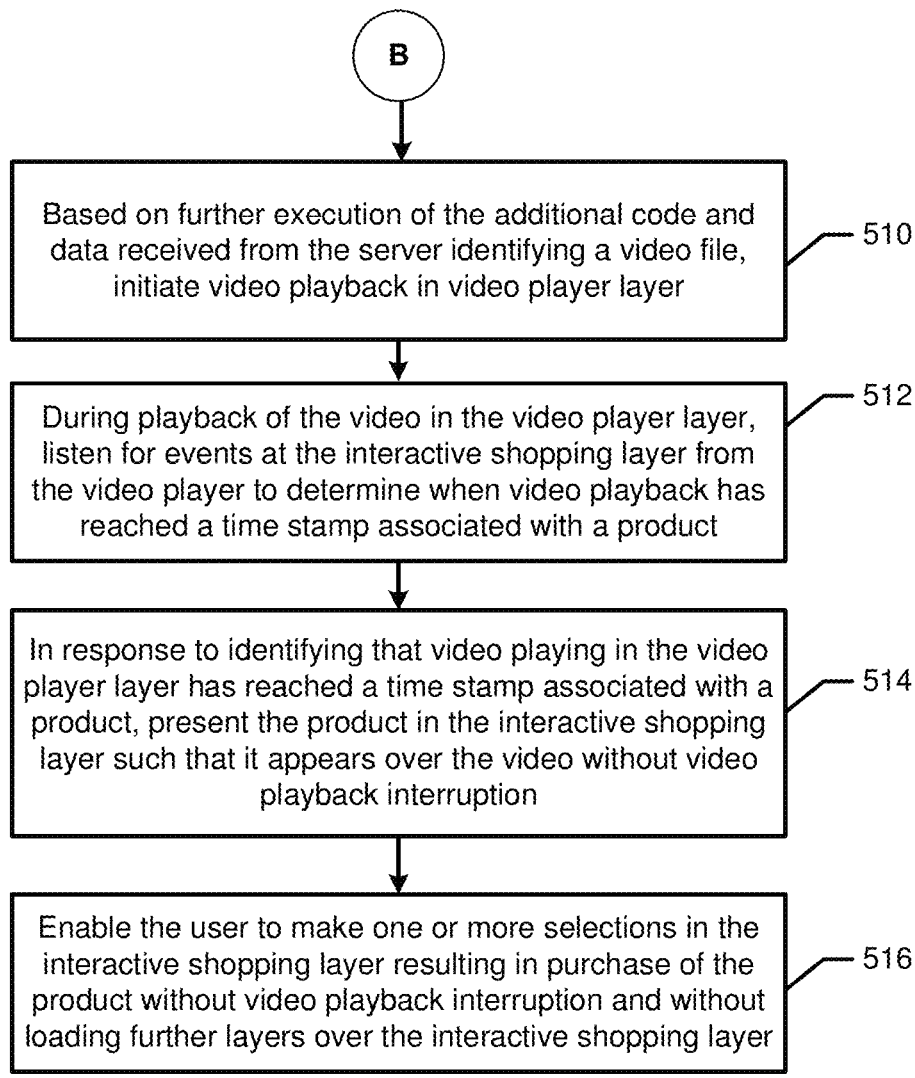

FIGS. 5A and 5B are flow diagrams of an illustrative method 500 for providing in-video shopping functionality, as implemented by a client device, according to some embodiments. The illustrative method 500 may be implemented, for example, by one of client devices 110 operated by a user accessing a page or user interface for display. Illustrative method 500 has some similarities to method 400 described above, but is described from the perspective of actions implemented by the client device rather than by the in-video shopping system 130. Accordingly, certain blocks of FIGS. 5A and 5B will only be described briefly below because they are similar to portions of method 400 described above.

The illustrative method 500 begins at block 502, where the client device receives a page or other user interface data for display by the client device. The page (such as may be defined by HTML, JavaScript, CSS or other executable or interpretable code or markup data) may be sent to the client device based on a browser of the client device or another application operating on the client device requesting the page from a given URL. The page may have been authored by a page publisher or website publisher that included an embed code associated with the in-video shopping system 130 within the page. As discussed above, the embed code may include a unique identifier associated with a video to be displayed within the page.

At block 504, the client device, as a result of executing or interpreting the embed code, may load an initial layer within a portion of the page to serve as an interactive content layer (or an interactive shopping layer). For example, the embed code may be associated within HTML of the page with an inline frame tag (iframe), where that inline frame is considered the initial layer. At block 506, the client device may send one or more network requests for (a) additional code to a server associated with the video commerce service (such as the in-video shopping system 130) and (b) a data package. The data package may include (1) item information for each of a plurality of products or other items to be presented during the video, and (2) video time stamps associated with each of the items. In other embodiments, the video time stamps may not be sent, but instead provided substantially in real time later at a point in which a given item is to be displayed in the interactive shopping layer.

At block 508, the client device may receive and execute the additional code to establish, within the portion of the page, a single page application (SPA) that loads a second layer (such as a second inline frame) positioned under the initial layer, where the second layer serves as a video player layer and includes video playback functionality. In some embodiments, the video player layer may not be populated with content initially. For example, a video player component or module serving as the video player may not be loaded by the client device until the video file is requested, such as from a video hosting platform. In other embodiments than that illustrated in FIG. 5A, the video player may be loaded in an initial layer (e.g., an initially generated inline frame) and the overlay shopping functionality may be provided in a second layer (such as an inline frame generated after the initial inline frame) that is assigned a display position or order in front of the initial layer.

Proceeding to FIG. 5B, at block 510 of method 500, the client device may obtain and initiate playback of the video in the video player layer. This may be caused based on further execution by the client device (such as by a browser operating on the client device) of the additional code and data received from the server (such as from the in-video shopping system 130). The video may be obtained from a video hosting platform based on a URL or video identifier associated with the video hosting platform and provided to the client device by the in-video shopping system 130. In some embodiments, the client device requesting the video from the video hosting platform may cause the video hosting platform to send a video player module, library or code to the client device for supporting playback of the video, as is known in the art with respect to certain video hosting platforms that enable websites to embed videos within pages hosted outside of the video hosting platform. For example, once the client device receives a video player component from the video hosting platform or a related server or CDN, code executed or interpreted on the client device may inject the video player component into the inline frame or other object or layer referred to as the video player layer herein. In other embodiments, the video player and/or the video may be retrieved locally by the client device and/or may have already been loaded on the client device prior to receiving the initial code from the server.

At block 512, the client device may, during playback of the video in the video player layer, listen for events at the interactive shopping layer from the video player to determine when video playback has reached a time stamp associated with a product or other item. At block 514, the client device may, in response to identifying that the video playing in the video player layer has reached a time stamp associated with a product, present the product in the interactive shopping layer such that it appears over the video. In some embodiments, the item may be presented over the video without causing video playback interruption and without redirecting the browser or other application operating on the client device away from the page.

As discussed in more detail elsewhere in the present disclosure, the client device may then, at block 516, enable the user to make one or more selections in the interactive shopping layer resulting in purchase or acquisition of a product or other item without causing video playback interruption and without loading further layers over the interactive shopping layer. In some embodiments, as discussed above, user selections or requests to add items to an electronic shopping cart and/or proceed through a checkout process may be received via click or touch interactions with visual interface elements within the interactive shopping layer. In other embodiments, user input (including for adding an item to an electronic shopping cart, providing payment details, checking out, initiating a purchase, etc.) may be received by voice. For example, code executing on the client device may be configured to listen for one or more vocal phrases, commands or other vocal utterances (e.g., "add to cart," "purchase," and/or others) that are either processed locally or sent to a server for processing (such as to perform speech-to-text functionality, command lookup based on text results, etc.) in order to trigger the associated functionality without necessarily requiring any user interaction with a cursor, click, tap or touch gesture within the user interface. In some embodiments, sound signature technology may be used to trigger, such as via an API, an action associated with the underlying video based on a voice command. For example, if a user speaks a command such as "[service invocation phrase] order this product," the system may determine the product based at least in part on a sound signature associated with the video, broadcast television, or other content currently being presented to the user (which may be captured by a microphone at the client device).

Figure 6:
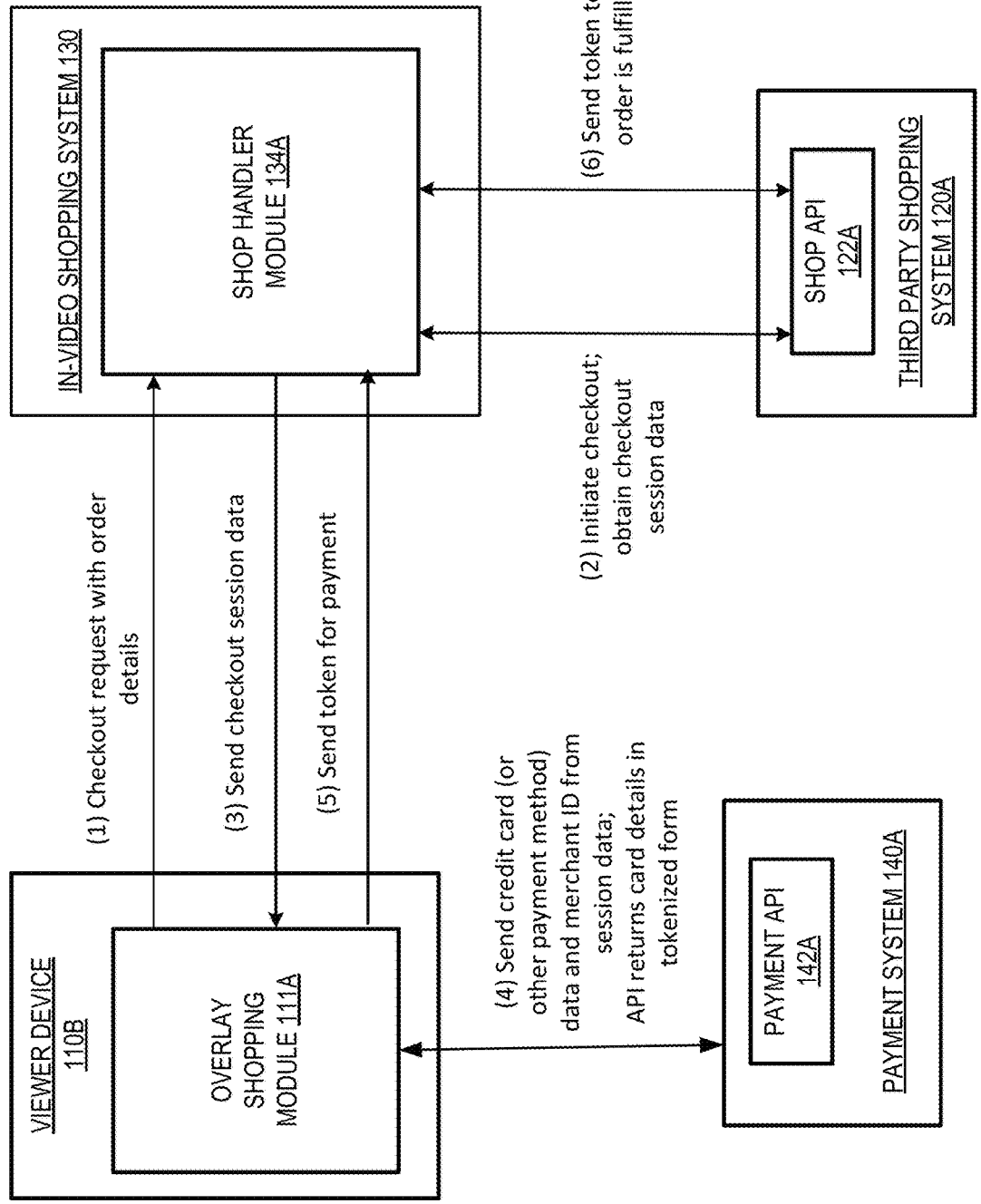
FIG. 6 is an illustrative flow diagram illustrating data flow between various systems to enable checkout of an electronic shopping cart in association with an overlay shopping module, according to some embodiments.

FIG. 6 is an illustrative flow diagram illustrating data flow between various systems to enable checkout of an electronic shopping cart in association with an overlay shopping module, according to some embodiments. The flow diagram of FIG. 6 may begin subsequent to block 514 in FIG. 5B described above, for example. As another example, the flow diagram of FIG. 6 may begin in response to a user operating viewer device 110B selecting a payment or purchase option displayed in a similar manner as FIG. 2E or 2F described above.

The illustrative data flow of FIG. 6 begins at step (1) with the overlay shopping module 111A of the viewer device 110B sending a checkout request with order details to the in-video shopping system 130. The overlay shopping module 111A may be, for example, code that the in-video shopping system 130 previously sent to the viewer device 110B to enable a shopping layer within a page or user interface to present items available for purchase in an overlay presented over video content. The order details may include, for example, item identifiers of items available for purchase via the third party shopping system 120A. In some embodiments, the order details may specific items available from two or more different shopping systems, which the in-video shopping system 130 may enable the user to purchase in a single transaction from the point of view of the viewer device 111A.

At step (2) of FIG. 6, the shop handler module 134A of the in-video shopping system 130 may initiate a checkout or item acquisition protocol or process with the third party shopping system 120A via API calls with the shop API 122A. The API 122A may have a checkout API component, which may include one or more API calls available to shop handler module in order to initiate and complete a cart or item checkout process. Information sent via one or more API calls at step (2) may include, for example, authentication information associated with an owner or other party associated with the particular account with the shopping system 120A (such as a publisher, streamer or other party, whose credentials may have been received by the in-video shopping system above with respect to FIG. 3). The information sent to the to shop API 122A at step (2) may further include various information associated with the purchaser (the user of viewer device 110B), such as shipping address, customer name, customer email address, item identifiers of items in the order, price, any discounts to be applied, and/or other data particular to the given shop API. The shop API 122A may return checkout session data, which may include a unique identifier or token for the checkout instance that the in-video shopping system may return in subsequent API calls to the shop API 122A. In some embodiments, the session data may further include a merchant identifier or seller identifier associated with an account of the publisher that set up the overlay shopping instance by including an embed code in their page. The in-video shopping system may later, for instance, use this information to send at least a portion of the transaction funds to the seller, potentially after the in-video shopping system retains a percentage of the payment.

At step (3) of FIG. 6, the shop handler module 134A of the in-video shopping system 130 may send the checkout session data (which may include a token from the shop API 122A) to the overlay shopping module 111A being executed on the viewer device 111A during playback of a video. The information passed to the payment API 142A may include a merchant identifier indicating the recipient of the payment. Depending on the embodiment, the immediate recipient of payment may be an operator of the in-video shopping system, the third party shopping system, or the publisher (or shop owner). Code operating in association with the overlay shopping module 111A may then cause the viewer device 110B to communicate via API calls with a payment API 142A of a payment system 140A. These calls may be sent during or after entry of payment method details by the user of viewing device 110B in an overlay shopping layer as shown with respect to FIG. 2F described above. In some embodiments the user may enter the user's access credentials (such as a login and password) previously established with the payment system in order for the payment system to retrieve previously stored credit card details of the user.

Upon processing the credit card, gift card, or other payment method to the recipient indicated by a merchant identifier or other identifier in the API call(s) to the payment API, the payment API 142A may return the card details in a tokenized form to the viewer device 110B, as is known in the art.

At step (5), the overlay shopping module 111A may send the tokenized payment information to the shop handler module of the in-video shopping system, which in turn may at step (6) pass the tokenized payment information to the shop API 122A in an additional API call in order to complete the purchase transaction. The third party shopping system 120A may then complete the order using its standard or existing order fulfillment methodology and send a confirmation back to the shop handler module. Though not illustrated in FIG. 6, the in-video shopping system may then send a confirmation indication back to the overlay shopping module 111A, which may cause the overlay shopping module to display visual order confirmation content such as that shown in FIG. 2G.

For physical products, an operator of the third party shopping system may then handle physical mailing of the items to a mailing address of the purchaser. For digital content items, the items may be sent to the viewer device 110B electronically, either from the third party shopping system or delivered via the in-video shopping system or another system. In some embodiments, a digital item included in an order may involve unlocking or providing access to additional video content on the viewer device 110B, potentially for playback within the same page that includes the overlay shopping module 111A.

For example, in some instances, the initial video playing on the page may be a movie trailer or video preview of longer video content offered for purchase via the shopping layer displayed over the trailer as it plays. In these instances, the in-video shopping system 130 may maintain information associating the given item identifier made available for purchase with a token for unlocking the full video or accessing the full video. Upon order confirmation at step (6) in some of these instances, the in-video shopping system 130 may send a signal or token to the overlay shopping module 111A that causes the SPA to enable or cause playback in the video player layer of video previously inaccessible to the user. This may include either swapping out the prior video and loading a second video from a different URL in the same video player layer of the page, or removing playback blocking mechanisms previously in place by the SPA (such as the overlay shopping layer previously preventing playback beyond a certain time marker in the video via library calls to the video player and/or blocking user selections with respect to the video player controls via the overlay layer).

In some embodiments, the completed transaction or transfer of funds may not be a purchase of anything tangible or digital that is provided to the user, but rather represent a gift, donation, or other benefit to a third party. For example, an in-video shopping layer may include items such as a donation to a charity, a donation to a political cause, a payment to a streamer or other individual for whom the user would like to show support, etc. In other embodiments, a given item may represent a benefit to the user that does not require payment from the user. For example, a given item may represent a discount code, monetary credit or website privileges that the user receives in exchange for providing contact information or other information (such as for a mailing list, subscriber list, etc. maintained by the publisher) rather than for making a payment.

Figure 7A:
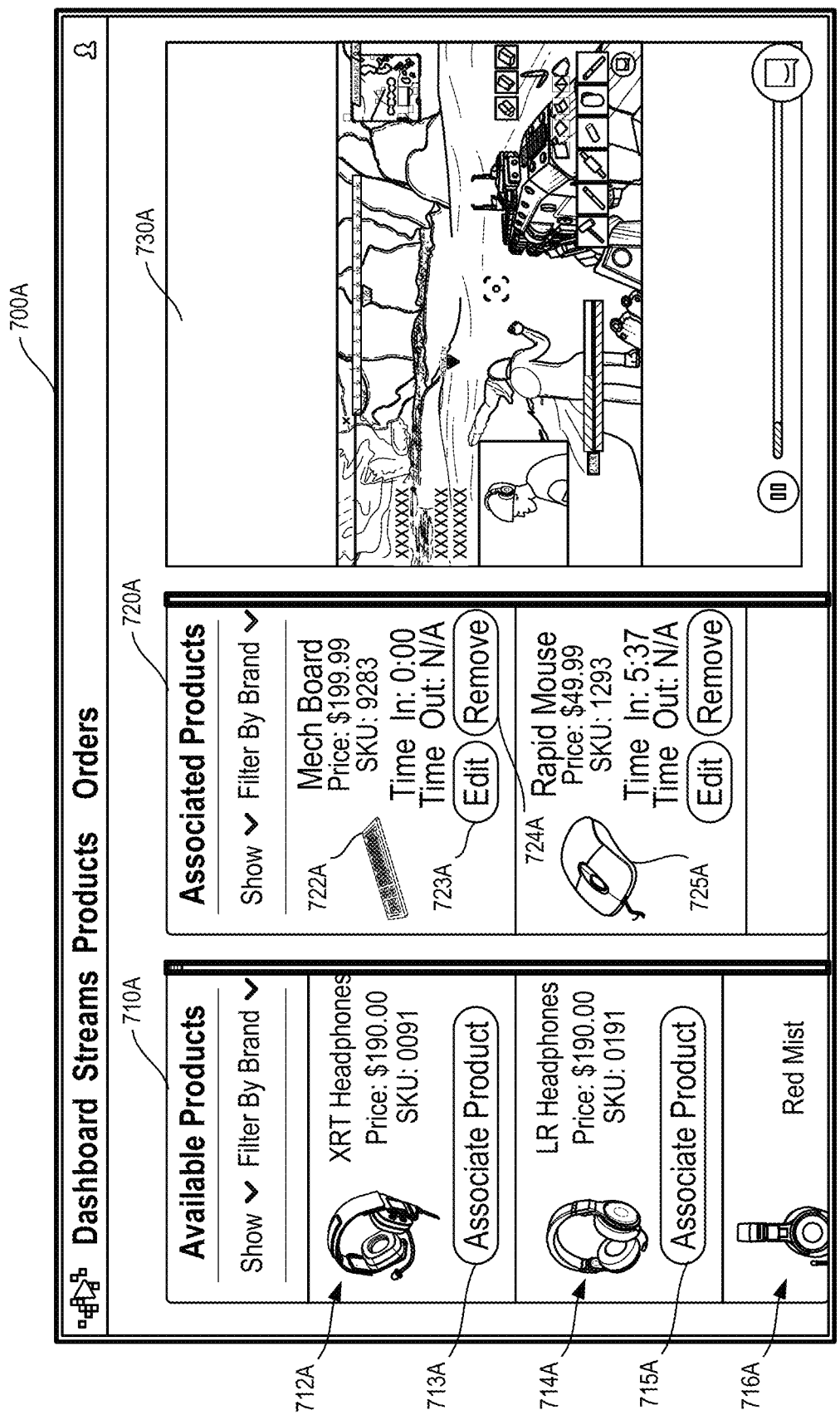
FIGS. 7A and 7C are illustrative user interfaces that may be presented on a streaming device to a streamer who selects items for insertion in an interactive shopping overlay during a live video stream.
Figure 7B:
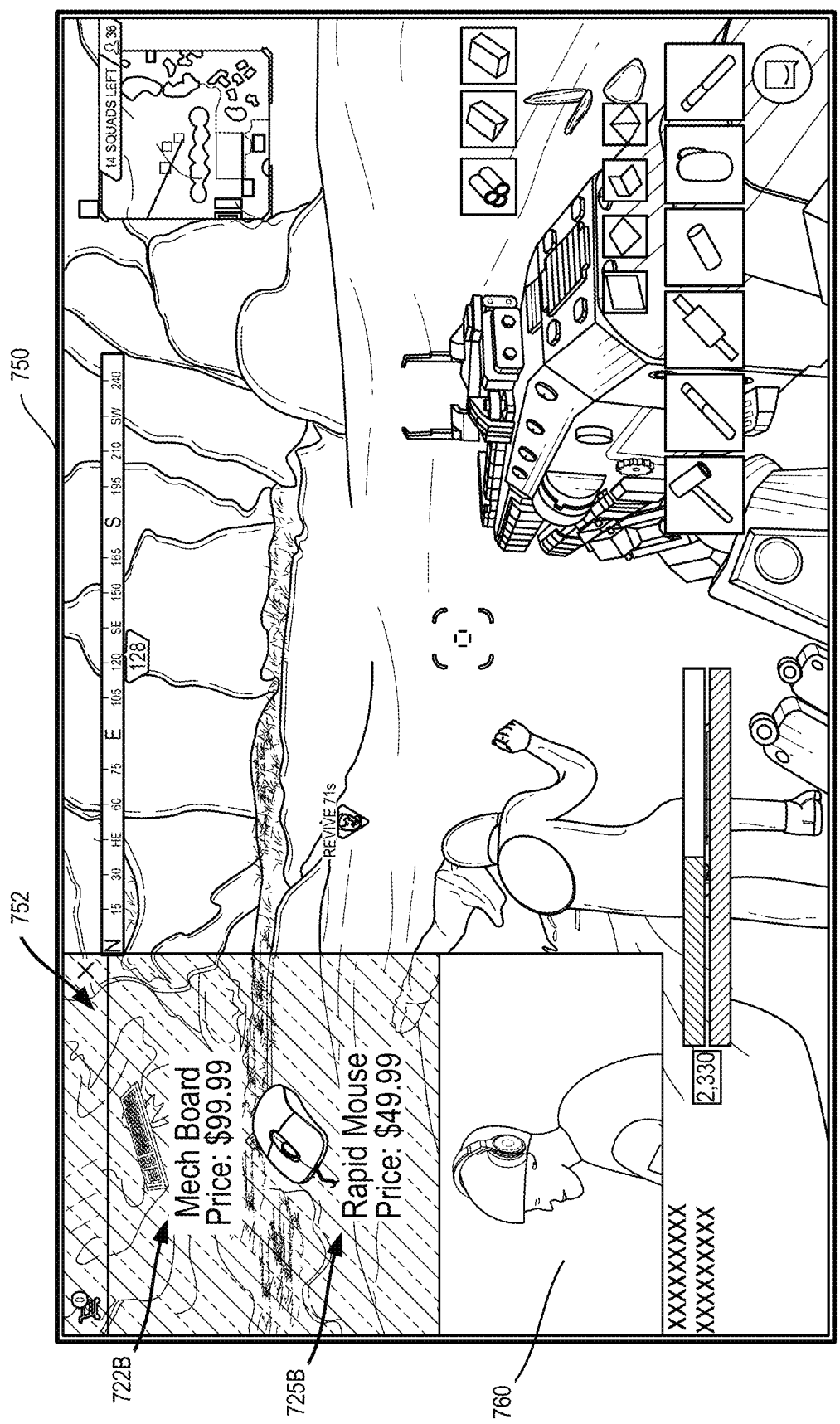
FIGS. 7B and 7D are illustrative user interfaces with video shopping overlays that may be presented on a client device of a streaming video viewer, such as a user viewing the video stream associated with FIGS. 7A and 7C.
Figure 7C:
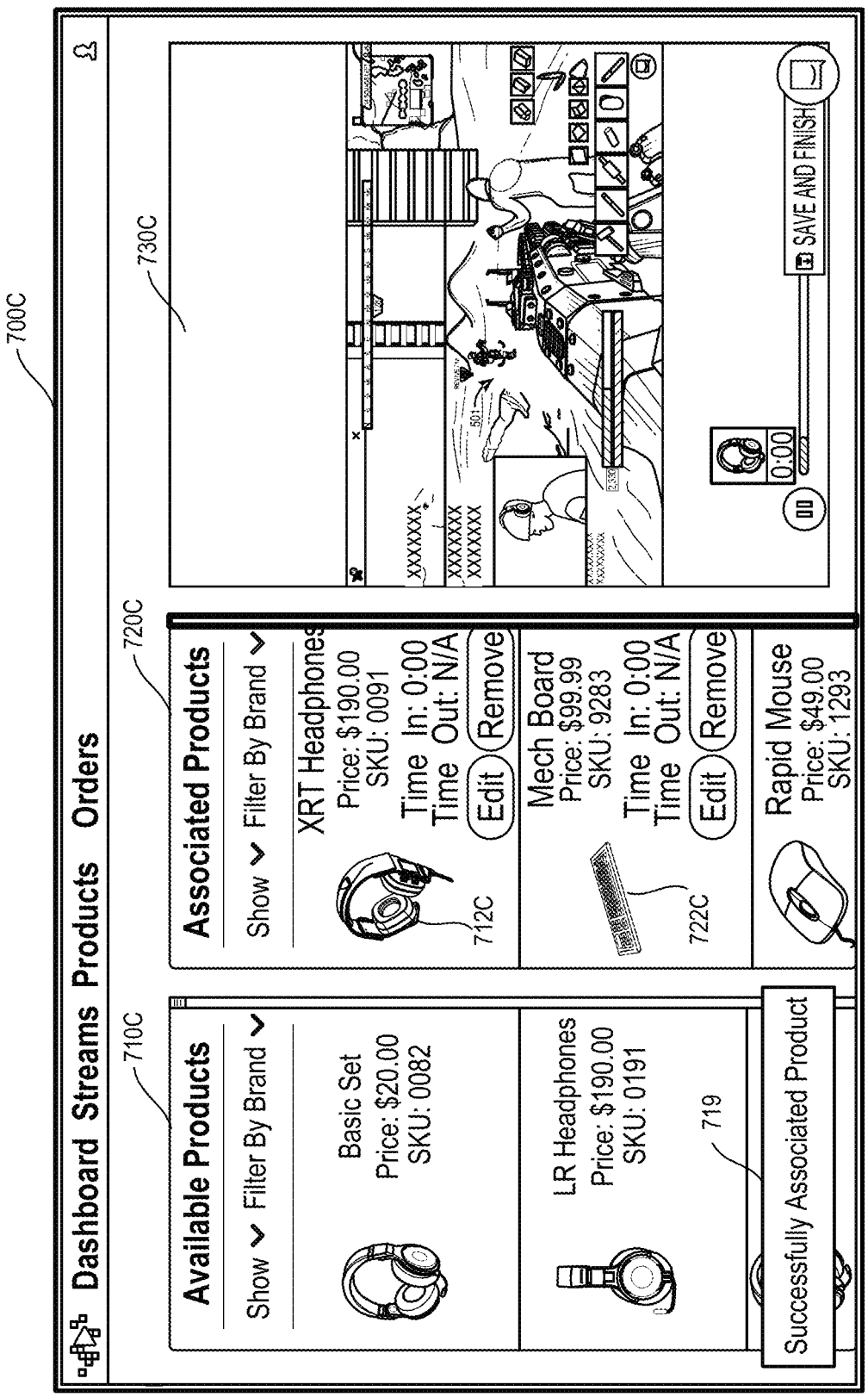
Figure 7D:
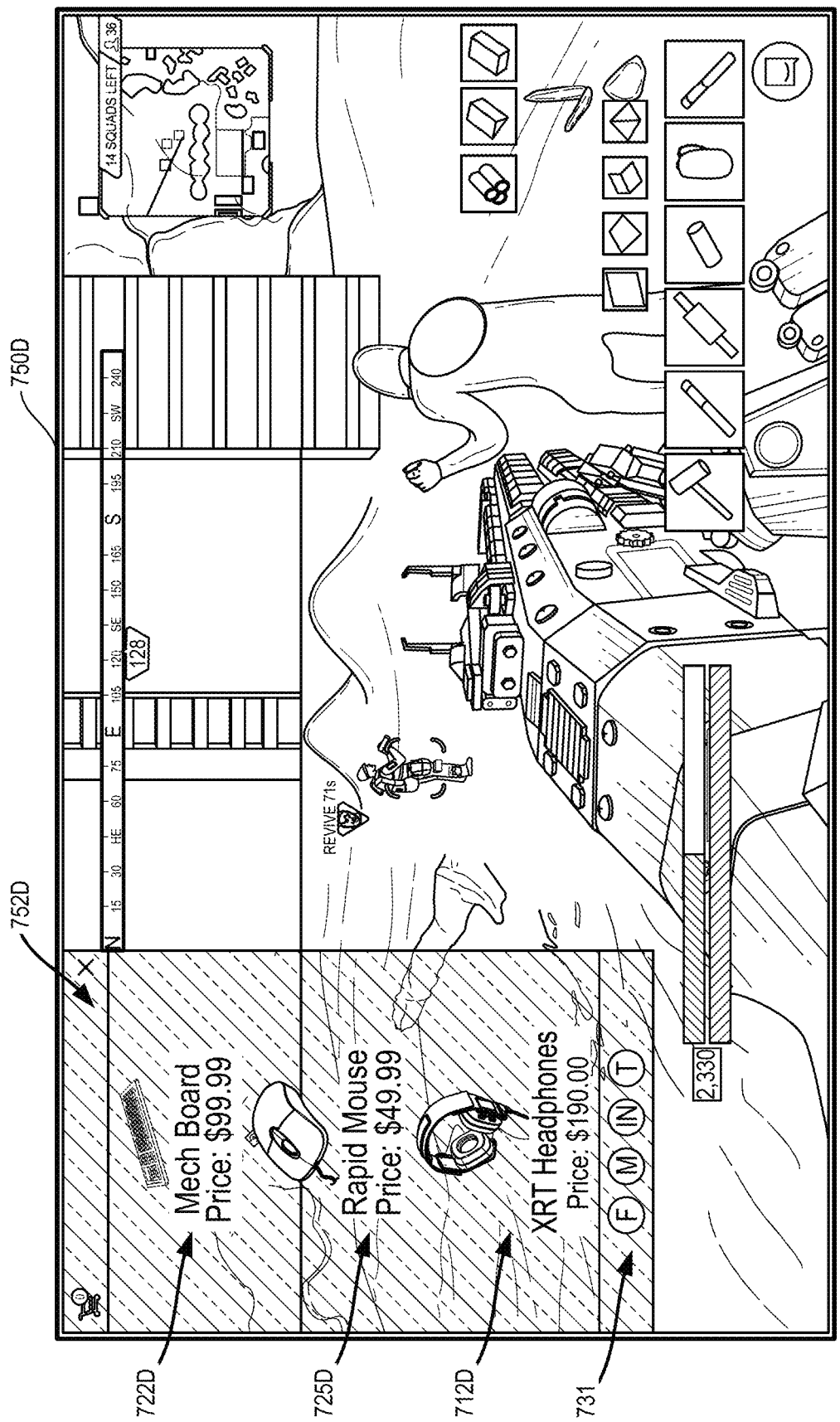

FIGS. 7A and 7C are illustrative user interfaces that may be presented on a streaming device to a streamer who selects items for insertion in an interactive shopping overlay during a live video stream. FIGS. 7B and 7D are illustrative user interfaces with video shopping overlays that may be presented on a client device of a streaming video viewer, such as a user viewing the video stream associated with FIGS. 7A and 7C. While the user interfaces of FIGS. 7A-7D are illustrated as presented within a browser window and may be considered webpages, in other embodiments any of these user interfaces may be presented in a standalone software application. For example, an operator of the in-video shopping system 130 may make a software application (or a plug-in to a third party application) available to streamers desiring to provide in-video shopping functionality to the streamers' viewers. As another example, viewing users may utilize social media applications, video applications, streaming content applications, and/or other applications besides a web browser to view video streams shown in FIGS. 7B and 7D.

FIG. 7A is an illustrative user interface 700A that may be presented on a streaming device to a streamer who selects items for insertion in an interactive shopping overlay during a live video stream. As is known in the field of live streaming, the streamer may utilize a video camera, microphone and/or screen capturing software in order to record the streamer's physical environment (such as video of the streamer himself sitting at a computer or walking around with a mobile device's camera). There are many forms of live video streaming, which as a category may include live streaming of an individual's video game play, live sporting events (such as multi-camera professionally recorded broadcasts), impromptu streaming of an interesting occurrence from a mobile phone (such as a celebrity sighting or a crime in progress, etc.), and many others. While FIG. 7A is shown with reference to an example instance of video game streaming, it will be appreciated that this is not limiting in any manner with respect to the subject matter or content of video that may be streamed in accordance with aspects of the present disclosure.

User interface 700A may be shown to the streamer substantially in real time as the streamer records and uploads live video. The stream view 730A may display a live view of the content being captured by the streamer's device for simultaneous or near simultaneous upload to a hosting service or streaming service for broadcasting to stream viewers. In the illustrated example, the streamer is playing a video game that is shown live in content portion 730A and also includes video of himself as he plays the game within the stream content 730A. Methods and user interfaces for laying out and managing the video stream content itself, such as for video game streaming, are known in the art and need not be described herein. In some embodiments, the user interface 700A may include functionality typically associated with video streaming software for arranging and coordinating different video sources (such as the camera recording the player, screen capture functionality, video output directly from a video game console, and/or other sources). In other embodiments, the streamer may be operating different software on the same device or another device that arranges the video sources and provides a stream of a single output video to the user interface 700A for live display in portion 730A. In still other embodiments, the view 730A may be a live stream view directly from a streaming host server (such as the same stream that stream viewers are viewing), such that the streamer (either from the device displaying user interface 700A or another local device being used simultaneously by the steamer) has uploaded the given video frame currently shown in 730A (such as within the last few seconds) and then received it back from the stream hosting platform over the Internet as a viewer of the stream.

The available products section 710A includes display of items 712A, 714A and 716A that are available to the streamer to add to an overlay shopping layer to be presented to stream viewers. As discussed above, the available items may have been imported from a virtual store previously set up by the streamer and associated with the streamer's account with the in-video shopping system 130 and/or a third party shopping system. The streamer may select option 713A in order to associate the item 712A with a display start time in the stream (either as the current, immediate time, or as a specified upcoming time marker), or may select option 715A in order to associate the item 714A with a display start time.

The associated products section 720A displays, to the streamer, items 722A and 725A that the streamer has previously associated with specific times for presentation to streaming viewers (such as in a video overlay shown to streaming viewers over the video stream content, as shown in FIG. 7B). As illustrated in section 720A, the item 722A has a "time in" of 0:00 and a "time out" of "N/A," which may indicate that the item 722A is currently set to be offered to viewing users throughout the entirety of the video stream. The streamer may modify this item information for item 722A by selecting the edit option 723A, or may immediately remove the purchase option for viewing users for item 722A by selecting the "remove" option 724A. In some embodiments, the "remove" option may cause the item 722A to no longer be displayed to streamers in a manner where they can add the item 722A to a shopping cart, but users who previously added the item 722A to a shopping cart may still have a certain amount of time (e.g., a set number of minutes) to complete a checkout process to purchase the item 722A. As another example, the item 725A has a "time in" of 5:37, which indicates that the streamer did not make item 725A available to viewers to purchase at the start of the stream, but instead caused the item 725A to be presented to viewers at 5 minute and 37 seconds into the live streaming broadcast.

FIG. 7B illustrates a user interface or portion of a user interface 750 that may be seen by viewers of the video stream set up by the streamer in accordance with FIG. 7A described above. The user interface 750 may be loaded on the viewer's device as an SPA (which may be embedded within a portion of a page or other larger user interface) in accordance with methods described elsewhere herein. The video game content and the camera-captured video of the streamer 760 may be received by the viewer's device from a video hosting platform or streaming service by a video player component within one layer of the user interface or page, while the overlay content portion 752 may be loaded in a separate layer and received from the in-video shopping system 130. The overlay content 752 includes display of items 722B and 725B (the same items as items 722A and 725A of FIG. 7A), which the viewing user may select in order to view additional information, add an item to an electronic shopping cart, and/or complete a purchase according to methods previously described. For example, subsequent updates to the overlay portion 752 as the viewing user makes selections and interacts with the overlay portion 752 while the streaming video content continues to be presented underneath may be similar to those shown in FIGS. 2B-2G described above.

FIG. 7C illustrates a user interface 700C that may be presented to the streamer soon after user interface 700A of FIG. 7A during the same live streaming session. As seen in video portion 730C, the streamer's play of the video game has progressed relative to FIG. 7A. Furthermore, an additional item 712C has been added to the available products section 720C relative to what was shown in section 712A of FIG. 7A (though item 722C remains in the available products as it was previously). Item 712C may have been added to the available products 720C as a result of the streamer selecting option 713A of FIG. 7A to add the "XRT Headphones" item (labelled as item 712A, 712C and 712D in different figures) to the stream overlay. Accordingly, the "XRT Headphones" item has been moved from available products 710C to associated products 720C, and a success indicator 719 is displayed noting that the item 712C was successfully added to the stream.

FIG. 7D illustrates a user interface or portion of a user interface 750D that may be seen by viewers of the video stream set up by the streamer in accordance with FIG. 7C described above. In some embodiments, the user interface 750D may be seen by viewers in real time or substantially in real time (e.g., within seconds) with respect to the point in time at which the streamer selected to add the item "XRT Headphones" 712D to the stream overlay. Accordingly, relative to user interface 750 described above with respect to FIG. 7B, the overlay content portion 752D has been dynamically updated to include not only previously displayed items 722D and 725D, but also new item 712D. The user interface also includes social media sharing options 731 that enable the viewer to share information regarding the offered items to others (previously discussed above).

Figure 8:
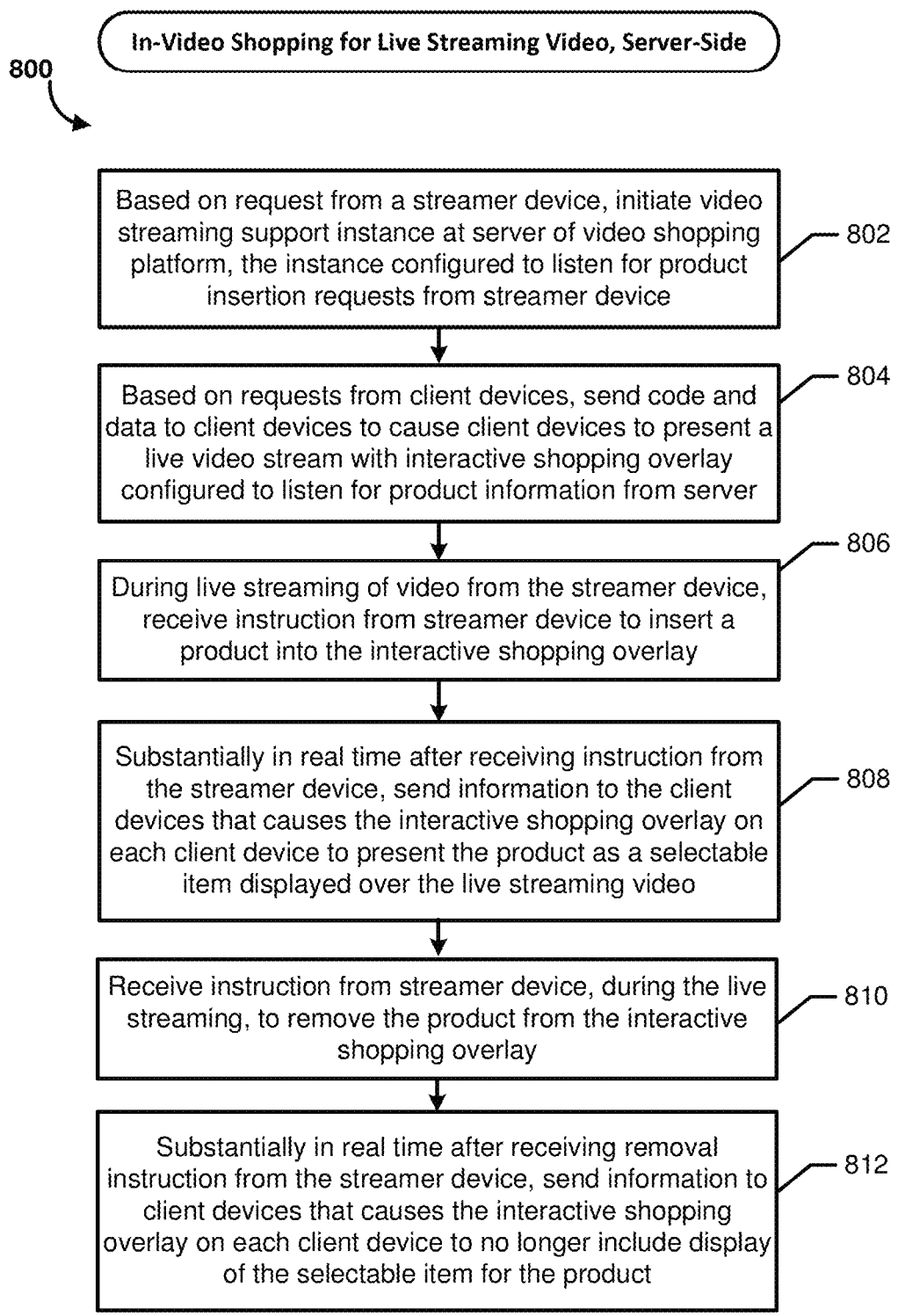
FIG. 8 is a flow diagram of an illustrative method for enabling in-video shopping functionality during presentation of live streaming video content.

FIG. 8 is a flow diagram of an illustrative method 800 for enabling in-video shopping functionality during presentation of live streaming video content. The illustrative method 800 may be implemented by the in-video shopping system 130, either alone or in cooperation with one or more additional systems. Method 800 may be implemented, for example, to support features described above with respect to FIGS. 7A-7D.

The method 800 begins at block 802, where the in-video shopping system 130 may, based on a request from a streamer device, initiate a video streaming support instance. The support instance at a server of the in-video shopping system 130 may be configured to listen for product insertion requests from the streamer device, such as those triggered by a selection of an "associate product" option within a user interface similar to FIG. 7A that is presented on the streamer's computing device.

At block 804, the in-video shopping system 130 may, based on requests from one or client devices viewing the live stream, send code and data to the client devices to cause the client devices to present the live video stream with an interactive shopping overlay configured to listen for item information from the in-video shopping system 130. The specific code provided to the client devices to enable such functionality on the client devices is described above with reference to FIGS. 4A, 4B, 5A and 5B. Whereas some embodiments described above include the in-video shopping system 130 sending item time markers during the initial loading of the shopping overlay, block 804 may send the stream URL and code that configures the client device to wait for real time signals from a server of the in-video shopping system 130 in order to determine when to display items in the overlay content. In some embodiments, the item information itself may be sent to the viewer devices in advance (prior to any instruction or time marker to actually display the items), while in other instances the item information may be sent in real time when the item is to be displayed.

At block 806, during live streaming of video from the streamer device (where such video content may be uploaded live from the streamer device to a streaming host, then streamed from the streaming host to client devices for display in a video player layer on the client devices), the in-video shopping system 130 may receive an instruction from the streamer device to insert a product or other item into the interactive shopping overlay. This instruction may include an item identifier that the in-video shopping system 130 uses to retrieve corresponding item details from a data store. The insertion request may indicate a start time and end time that the streamer has selected or provided for the given item. In some instances one start time value (which may be an enumerated value or a specific numeric value such as "0:00") may represent that the item should be displayed "now" or immediately upon the streamer's device sending the insertion signal or request. Other start times could indicate a specific upcoming point in the overall stream, as specified by a time marker in the overall duration of the stream or as a relative amount of time (e.g., in 30 seconds from the insertion command).

At block 808, the in-video shopping system 130 may, substantially in real time after receiving the insertion instruction from the streamer device, send information to the client devices that causes the interactive shopping overlay on each client device to present the specified item as a selectable item displayed over the live streaming video in an overlay. In some embodiments, these signals or communications may be sent asynchronously such that different devices actually display the item at slightly different points in time (e.g., milliseconds or seconds apart from one another) based on factors such as network speed, latency, computer processor speed, etc.

At block 810, the in-video shopping system 130 may receive an instruction from the streamer device, during the live streaming, to remove the product (such as the product added at block 806) from the interactive shopping overlay. Blocks 810 and 812 may be optional blocks that do not occur in every instance, given that a streamer may either desire for the item to remain displayed for the rest of the stream duration or may have previously indicated a stop time when initially adding the item to the stream. In response, at block 812, the in-video shopping system 130 may, substantially in real time after receiving the removal instruction from the streamer device (such as within a second or a few seconds), send information to the client devices that causes the interactive shopping overlay on each client device to no longer include display of the selectable item as a purchase option. As discussed above, in some embodiments, users who already added the item to a shopping cart or started a checkout process with respect to the item may be given a time window in which to complete the purchase or acquisition after the removal instruction is received at the client device.

Figure 9A:
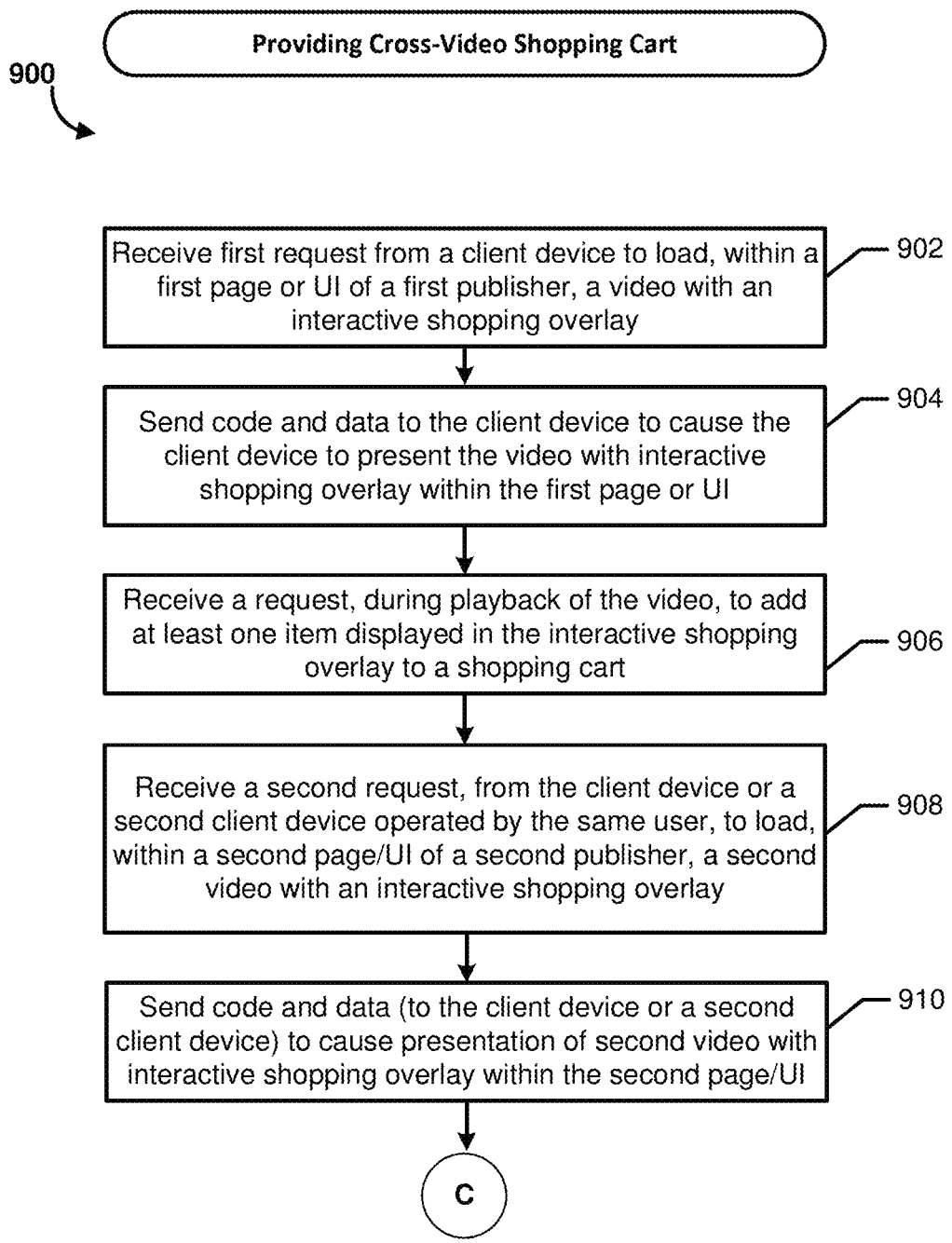
FIGS. 9A and 9B are flow diagrams of an illustrative method for providing a cross-video shopping cart, according to some embodiments.
Figure 9B:
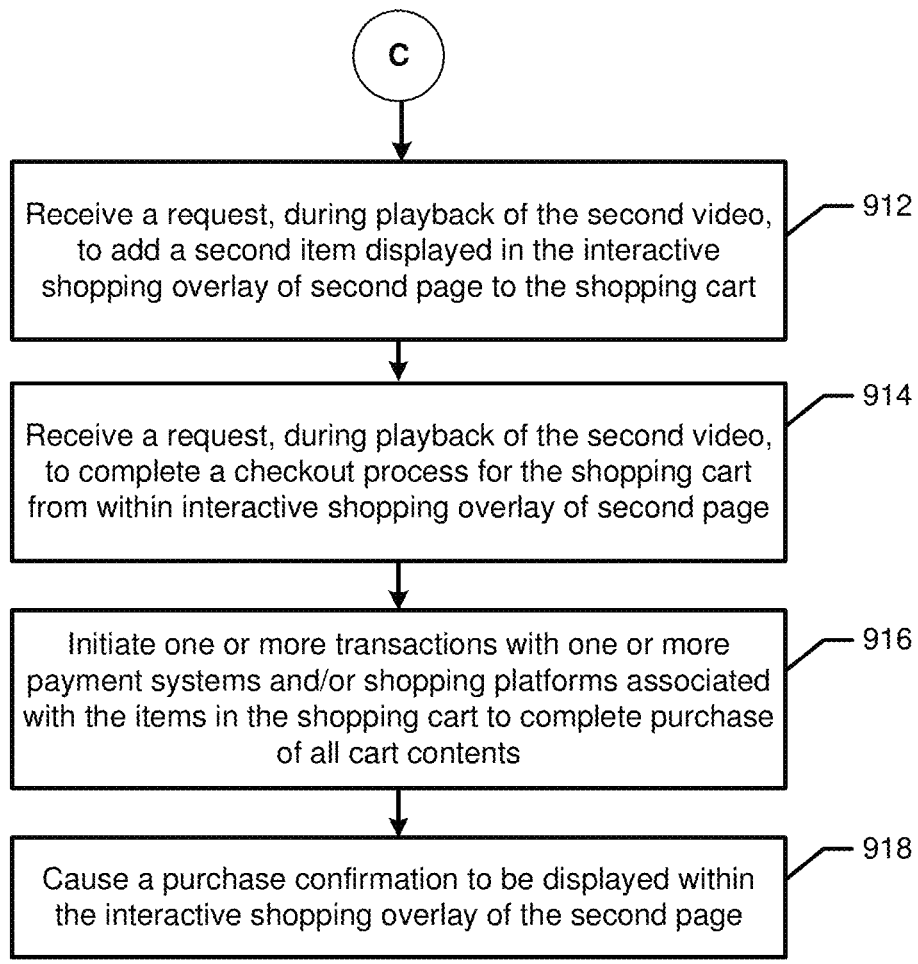

FIGS. 9A and 9B are flow diagrams of an illustrative method 900 for providing a cross-video shopping cart, according to some embodiments. The illustrative method 900 may be implemented by the in-video shopping system 130, either alone or in cooperation with one or more additional systems. While method 900 will be described with respect to a user adding items to an electronic shopping cart or shopping list that is persistent across two different websites or pages, the persistent shopping cart features and related features described herein also enable a persistent shopping cart that enables joint checkout involving two or more different payment processors, two or more different third party shopping systems, two or more different publisher systems, two or more different video hosting platforms, and/or two or more different client devices sharing a user account.

The illustrative method 900 begins at block 902, where the in-video shopping system 130 may receive a first request from a client device to load, within a first page or user interface of a first publisher, a video with an interactive shopping overlay. In response, at block 804, the in-video shopping system 130 may send code and data to the client device to cause the client device to present the video with interactive shopping overlay within the first page or user interface, as has been described in detail above.

Next, at block 906, the in-video shopping system 130 may receive a request, during playback of the video, to add at least one item displayed in the interactive shopping overlay to an electronic shopping cart. The in-video shopping system 130 may determine whether the user has an account with the in-video shopping system 130 and/or whether a current session associated with the client device has an active shopping cart. In some embodiments, this may include checking for a cookie stored on the client device to determine whether the cookie is associated with cart contents stored either on the client device (such as within the cookie itself) or previously stored in a local or remote database maintained by the in-video shopping system 130 (such as by checking the database for any previously saved items associated with a session identifier, user identifier, or other identifier stored in the cookie). In other instances, the user may have an account with the in-video shopping system 130 or a partner system (such as a shopping system or payment processor, or a social network service or similar service that enables sharing of user information for login purposes), in which case the user's device or a partner service may send login credentials or an associated token that is used to retrieve any existing shopping cart contents from a data store.

The in-video shopping system 130 may then (not illustrated in FIG. 9A) either add the newly requested item to an existing shopping cart or saved item list in association with the user account and/or session, or create a new shopping cart that includes the newly added item and is associated with the user, device and/or session information.

At block 908, the in-video shopping system 130 may receive a second request, from the same client device or a second client device operated by the same user, to load, within a second page or user interface of a second publisher, a second video with an interactive shopping overlay. This second request may be some time (such as hours or days) after the user added the first item to a shopping cart, and the user did not complete a purchase or checkout process when viewing the first video. As discussed above, the second page from the second publisher (such as from a different website than the first page) may display a different video from a different video hosting platform than the first page did, and may present entirely different items for purchase (e.g., may not offer the first item previously added to the cart). In response, at block 910, the in-video shopping system 130 may send code and data (to the client device or second client device) to cause presentation of the second video with interactive shopping overlay within the second page or user interface. In some embodiments, the in-video shopping system 130 may determine prior to block 910 that the user has existing cart contents (such as from login credentials and/or cookie data) and may send an indication that causes the overlay content to visually indicate this (such as including a cart icon with a number indicating the number of items in the persistent shopping cart).

At block 912, the in-video shopping system 130 may receive a request, during playback of the second video on the client device or second client device, to add at least a second item displayed in the interactive shopping overlay of the second page to the shopping cart. In response, the in-video shopping system 130 may modify the stored cart contents to include the additional item identifier identifying the second item, which may be purchasable via a different shopping platform than the first item. In some embodiments, the stored data regarding a given item in the cart in association with a given user may identify a shopping platform identifier, an item identifier, a store owner (or publisher) identifier, and/or other data.

Later in playback of the second video on the client device, at block 914, the in-video shopping system 130 may receive a request to complete a checkout process for the shopping cart from within the interactive shopping overlay of the second page. In response, the in-video shopping system 130 may, at block 916, initiate and complete one or more transactions with one or more payment systems and/or shopping platforms (if the cart contents include items from multiple shopping platforms) associated with the items in the shopping cart to complete the purchase, as described previously above. At block 918, the in-video shopping system 130 may then cause a purchase confirmation to be displayed within the interactive shopping overlay of the second page, indicating that all cart contents have been purchased. Additionally the in-video shopping system 130 may process distribution of funds in a manner that is not shown to the user, such as directing different portions of the sale price for the total cart contents to different sellers or publishers that caused the presentation of the particular items to the purchasing user.

Figure 10:
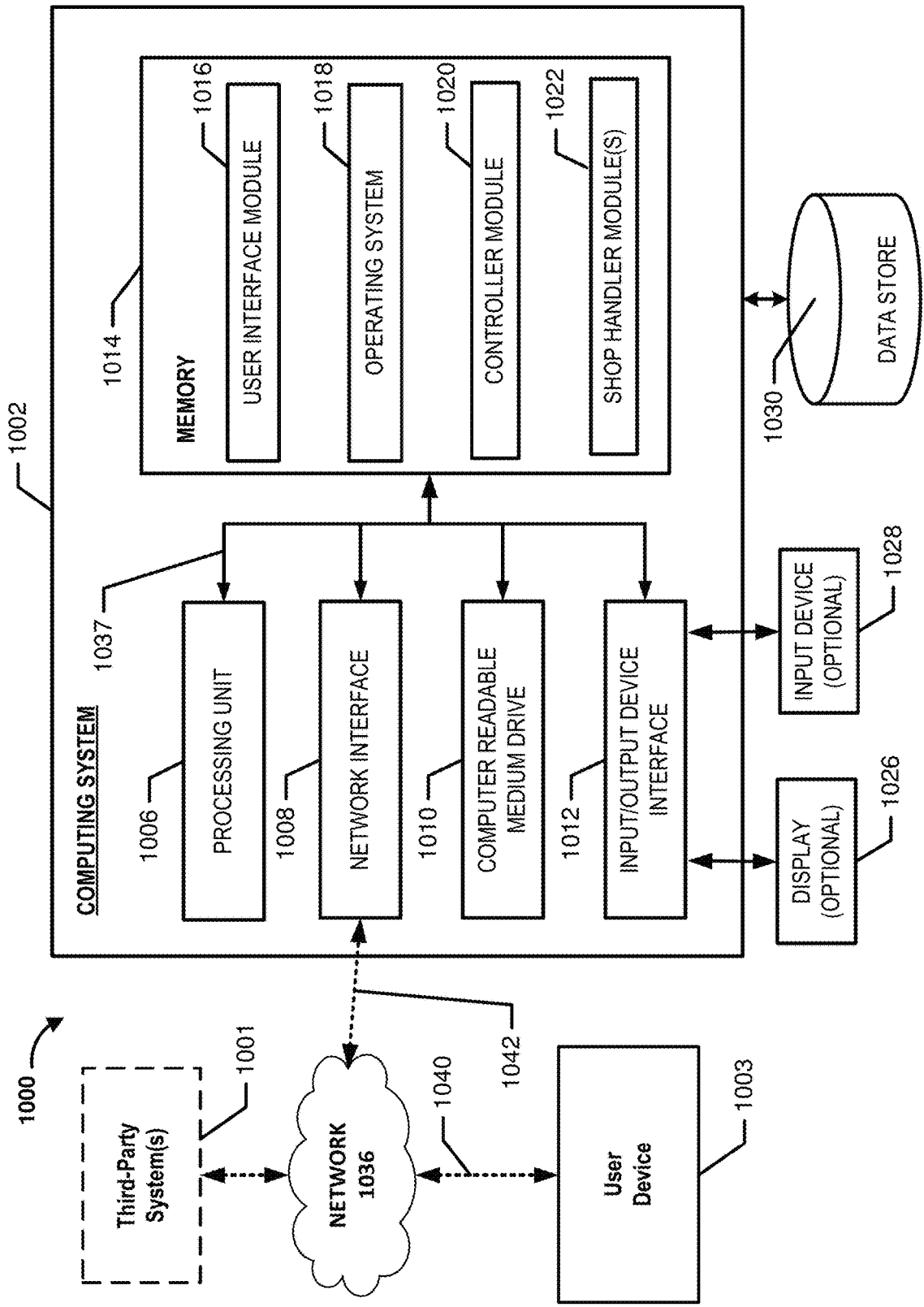
FIG. 10 is a system block diagram of a computing environment suitable for use in various embodiments of the present disclosure.

FIG. 10 illustrates a general architecture of a computing environment 1000, according to some embodiments. As depicted in FIG. 10, the computing environment 1000 may include a computing system 1002. The general architecture of the computing system 1002 may include an arrangement of computer hardware and software components used to implement aspects of the present disclosure. The computing system 1002 may include many more (or fewer) elements than those shown in FIG. 10.

As illustrated, the computing system 1002 includes a processing unit 1006, a network interface 1008, a computer readable medium drive 1010, an input/output device interface 1012, an optional display 1026, and an optional input device 1028, all of which may communicate with one another by way of a communication bus 1037. The processing unit 1006 may communicate to and from memory 1014 and may provide output information for the optional display 1026 via the input/output device interface 1012. The input/output device interface 1012 may also accept input from the optional input device 1028, such as a keyboard, mouse, digital pen, microphone, touch screen, gesture recognition system, voice recognition system, or other input device known in the art.

The memory 1014 may contain computer program instructions (grouped as modules or components in some embodiments) that the processing unit 1006 may execute in order to implement one or more embodiments described herein. The memory 1014 may generally include RAM, ROM and/or other persistent, auxiliary or non-transitory computer-readable media. The memory 1014 may store an operating system 1018 that provides computer program instructions for use by the processing unit 1006 in the general administration and operation of the computing system 1002. The memory 1014 may further include computer program instructions and other information for implementing aspects of the present disclosure. For example, in one embodiment, the memory 1014 may include a user interface module 1016 that generates user interfaces (and/or instructions therefor) for display upon a computing system, e.g., via a navigation interface such as a browser or application installed on the computing system 1002 or another system or device, such as user device 1003.

In some embodiments, the memory 1014 may include a controller module 1020 and one or more shop handler modules, which may be executed by the processing unit 1006 to perform operations according to various embodiments described herein. The modules or components 1020 and/or 1022 may access the data store 1030 in order to retrieve data described above and/or store data. The data store 1030 may be part of the computing system 1002, remote from the computing system 1002, and/or may be a network-based service.

In some embodiments, the network interface 1008 may provide connectivity to one or more networks or computing systems, and the processing unit 1006 may receive information and instructions from other computing systems or services via one or more networks. In the example illustrated in FIG. 10, the network interface 1008 may be in communication with a user device 1003 via the network 1036, such as the Internet. In particular, the computing system 1002 may establish a communication link 1042 with a network 1036 (e.g., using known protocols) in order to send communications to the computing device 1003 over the network 336. Similarly, the computing device 1003 may send communications to the computing system 1002 over the network 1036 via a wired or wireless communication link 1040. The computing system 1002 may additionally communicate via the network 1036 with one or more third-party systems 1001, many examples of which are described above (such as, for example, one or more payment services, shopping platforms, video hosting services, video streaming services, etc.).

Those skilled in the art will recognize that the computing system 1002 and user device 1003 may be any of a number of computing systems or devices including, but not limited to, a laptop, a personal computer, a personal digital assistant (PDA), a hybrid PDA/mobile phone, a mobile phone, a smartphone, a wearable computing device, an electronic book reader, a digital media player, a tablet computer, a gaming console or controller, a kiosk, an augmented reality device, a gaming or gambling-related machine (such as a slot machine), another wireless device, a set-top or other television box, one or more servers, and the like. The user device 1003 may include similar hardware to that illustrated as being included in computing system 1002, such as a display, processing unit, network interface, memory, operating system, etc.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer system for providing in-video shopping functionality, the computer system comprising:
    memory; and
    at least one physical processor in communication with the memory and configured with executable instructions that cause the at least one physical processor to:
        receive a first request from a client device to load, within a first user interface of a first publisher, an interactive shopping overlay that presents information regarding one or more items available for purchase during playback of a video;

send code and data to the client device to cause the client device to present the interactive shopping overlay over the video within the user interface;

receive a request, during playback of the video on the client device, to add at least one item displayed in the interactive shopping overlay to an electronic shopping cart;

add the at least one item to the electronic shopping cart, wherein the electronic shopping cart is associated with at least one of a user account, the client device, or a session;

receive a second request, from one of (a) the client device or (b) a second client device associated with the user account, to load, within a second user interface of a second publisher, a second interactive shopping overlay over a second video;

receive a request, during playback of the second video on the client device or the second client device, to add at least a second item displayed in the second interactive shopping overlay to the electronic shopping cart;

modify stored cart contents associated with the electronic shopping cart to include an item identifier identifying the second item;

during playback of the second video on the client device or the second client device, receive a request to complete a checkout process for the electronic shopping cart from within the second interactive shopping overlay; and initiate one or more transactions with one or more payment systems or one or more shopping platforms associated with items in the electronic shopping cart to complete purchase of the items in the electronic shopping cart during playback of the second video on the client device or the second client device.

2. The computer system of claim 1, wherein the initiating the one or more transactions comprising initiating a first transaction with a first payment processor and a second transaction with a second payment processor.

3. The computer system of claim 1, wherein the initiating the one or more transactions comprising initiating a first transaction with a first third-party shopping platform and a second transaction with a second third-party shopping platform.

4. The computer system of claim 1, wherein a first video hosting platform from which the client device receives the video is different than a second video hosting platform from which the second video is received by one of the client device or the second client device.

5. The computer system of claim 1, wherein the executable instructions further cause the at least one physical processor to:

prior to modifying the stored cart contents associated with the electronic shopping cart to include the item identifier identifying the second item, identify the stored cart contents based at least in part on a cookie retrieved from the client device.

6. The computer system of claim 5, wherein the cookie includes at least one of a session identifier or a user identifier.

7. The computer system of claim 1, wherein the video comprises a live stream broadcast comprising live video captured by a video camera of a streamer device, where frames of the live video are uploaded from the streamer device to a video hosting platform substantially in real time as the frames are captured by the video camera, and wherein the client device accesses the live stream broadcast from the video hosting platform.

8. The computer system of claim 1, wherein the request to complete the checkout process is initiated based at least in part on processing a vocal utterance of a user of the client device, wherein the vocal utterance matches a predetermined phrase previously configured to trigger a product purchase action.

9. The computer system of claim 8, wherein the vocal utterance is determined to match the predetermined phrase by code associated with the second interactive shopping overlay, executed on the client device, that is configured to identify the predetermined phrase in audio data based on a sound signature.

10. The computer system of claim 8, wherein the vocal utterance is determined to match the predetermined phrase at least in part by the computer system applying speech-to-text functionality with respect to audio data received from the client device.

11. A computer-implemented method comprising:

as implemented by a computer system, comprising one or more processors, configured with specific executable instructions, receiving a first request from a client device to load, within a first user interface of a first publisher, an interactive shopping overlay that presents information regarding one or more items available for purchase during playback of a video;

sending code and data to the client device to cause the client device to present the interactive shopping overlay over the video within the user interface;

receiving a request, during playback of the video on the client device, to add at least one item displayed in the interactive shopping overlay to an electronic shopping cart;

adding the at least one item to the electronic shopping cart, wherein the electronic shopping cart is associated with at least one of a user account, the client device, or a session;

receiving a second request, from one of (a) the client device or (b) a second client device associated with the user account, to load, within a second user interface of a second publisher, a second interactive shopping overlay over a second video;

receiving a request, during playback of the second video on the client device or the second client device, to add at least a second item displayed in the second interactive shopping overlay to the electronic shopping cart;

modifying stored cart contents associated with the electronic shopping cart to include an item identifier identifying the second item;

during playback of the second video on the client device or the second client device, receiving a request to complete a checkout process for the electronic shopping cart from within the second interactive shopping overlay; and initiating one or more transactions with one or more payment systems or one or more shopping platforms associated with items in the electronic shopping cart to complete purchase of the items in the electronic shopping cart during playback of the second video on the client device or the second client device.

12. The computer-implemented method of claim 11, further comprising:

prior to receiving the request to add the second item to the electronic shopping cart, sending an indication to the client device or the second client device that causes the second interactive shopping overlay for the second video to present a visual icon to reflect a count of items that are in the electronic shopping cart, wherein the count of items reflects one or more items added to the electronic shopping cart prior to presentation of the second video.

13. The computer-implemented method of claim 11, wherein the interactive shopping overlay is presented on the client device as part of a single page application ("SPA") in which the interactive shopping overlay presents content in synchronization with a video player layer that presents video content of the video.

14. The computer-implemented method of claim 11, wherein the one or more transactions are initiated and completed without redirecting a browser or application operating on the client device away from presentation of the second video.

15. The computer-implemented method of claim 11, wherein the interactive shopping overlay is presented on the client device within a first inline frame ("iframe") referenced in Hypertext Markup Language ("HTML"), wherein a video player layer that presents video content of the video comprises a second inline frame with a display position behind the first inline frame.

16. The computer-implemented method of claim 11, wherein the interactive shopping overlay is presented on the client device within a first layer of a webpage, wherein the first layer presents content at least in part in synchronization with playback times of video content of the video as presented in a video player layer of the webpage, wherein first layer synchronizes with the video player layer based at least in part by code configuring the first layer to listen locally for a plurality of events generated by a video player component of the video player layer.

17. The computer-implemented method of claim 11, wherein the second item is a physical product, wherein the second interactive shopping overlay comprises one or more fields for receiving shipping information to ship the physical product.

18. The computer-implemented method of claim 11, wherein the second item comprises a digital content item, the method further comprising causing the digital content item to be delivered to the client device after purchase of the second item via the second interactive shopping overlay.

19. The computer-implemented method of claim 11, wherein the first user interface is a webpage published by the first publisher, and wherein the second user interface is a webpage published by the second publisher.

\* \* \* \* \*